US009467648B2

(12) United States Patent
Kwon et al.

(10) Patent No.: US 9,467,648 B2
(45) Date of Patent: Oct. 11, 2016

(54) MOBILE TERMINAL AND CONTROLLING METHOD THEREOF

(71) Applicant: LG ELECTRONICS INC., Seoul (KR)

(72) Inventors: Yunmi Kwon, Seoul (KR); Hyemi Jung, Seoul (KR); Arim Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 141 days.

(21) Appl. No.: 14/212,207

(22) Filed: Mar. 14, 2014

(65) Prior Publication Data
US 2014/0267546 A1    Sep. 18, 2014

(30) Foreign Application Priority Data
Mar. 15, 2013  (KR) ........................ 10-2013-0028066

(51) Int. Cl.
*H04N 7/14* (2006.01)
*H04N 5/272* (2006.01)

(52) U.S. Cl.
CPC .............. *H04N 7/142* (2013.01); *H04N 5/272* (2013.01); *H04N 7/147* (2013.01)

(58) Field of Classification Search
CPC ....... H04N 5/272; H04M 2203/50–2203/509; H04M 3/56–3/569
USPC ................... 348/14.01–14.16; 370/259–271, 370/351–357; 379/201.01, 202.01–207.01; 709/201–207, 217–248
See application file for complete search history.

(56) References Cited

U.S. PATENT DOCUMENTS

| | | | |
|---|---|---|---|
| 5,657,096 A | 8/1997 | Lukacs | 348/585 |
| 6,535,239 B1 * | 3/2003 | Kim | H04N 7/141 348/14.02 |
| 7,706,576 B1 * | 4/2010 | Beck et al. | 382/118 |
| 7,911,513 B2 | 3/2011 | Garrison et al. | 348/239 |
| 8,411,130 B2 * | 4/2013 | Lee et al. | 348/14.08 |
| 2005/0099492 A1 * | 5/2005 | Orr | 348/14.08 |
| 2006/0152578 A1 * | 7/2006 | Kim | 348/14.01 |
| 2009/0231413 A1 | 9/2009 | Dunko | 348/14.08 |
| 2010/0171807 A1 * | 7/2010 | Tysso | 348/14.09 |
| 2011/0249086 A1 * | 10/2011 | Guo et al. | 348/14.12 |
| 2012/0268552 A1 * | 10/2012 | Choi et al. | 348/14.07 |

OTHER PUBLICATIONS

European Search Report issued in application No. 14159144.6 dated Jul. 8, 2014.

* cited by examiner

*Primary Examiner* — Hemant Patel
(74) *Attorney, Agent, or Firm* — KED & Associates LLP

(57) ABSTRACT

A mobile terminal and controlling method thereof are disclosed, by which a video merging can be performed in the course of a video call to a counterpart terminal. The present invention includes a camera configured to create a first video having a user of the mobile terminal taken therein, a wireless communication unit configured to receive a second video taken by the counterpart terminal, a controller configured to extract a user display region from the first video, and merge the user display region and the second video, and a display unit configured to display the merged video.

19 Claims, 23 Drawing Sheets

(a)     (b)     (c)     (d)

FIG. 5
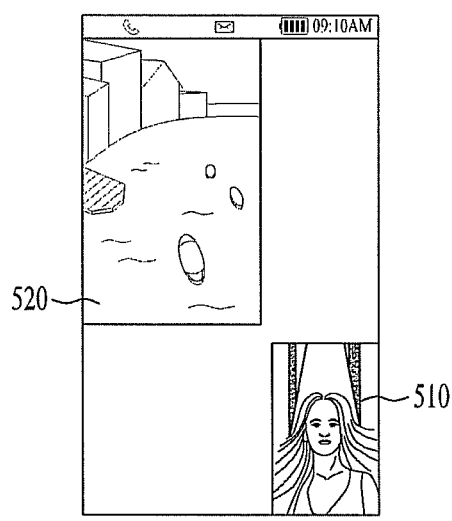
(a)
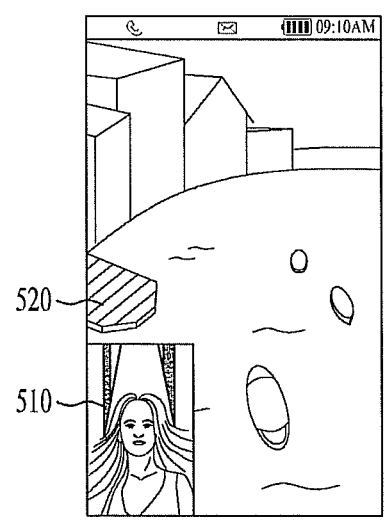
(b)

FIG. 11
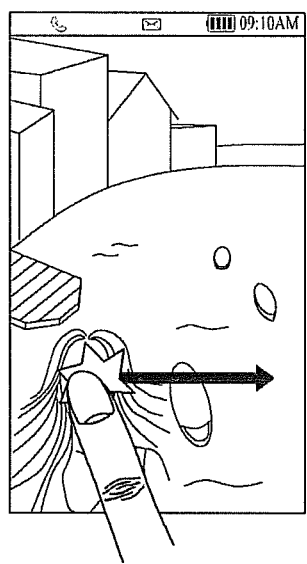
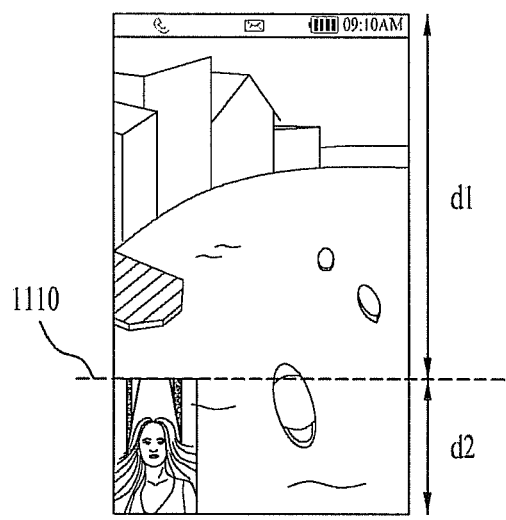
(a)    (b)

(a)   (b)

FIG. 15
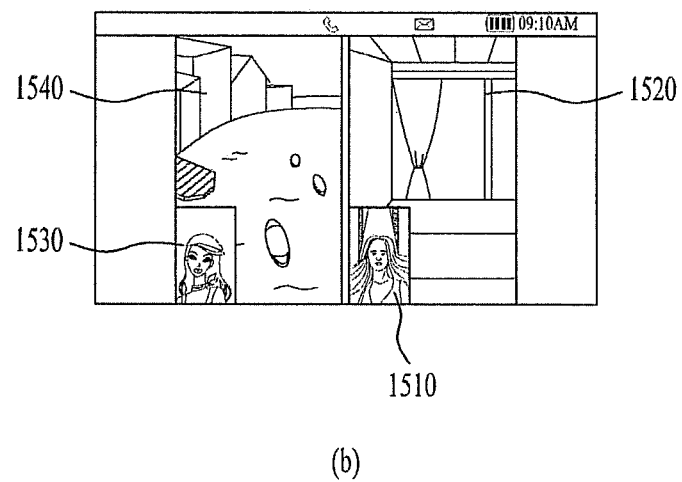

FIG. 21
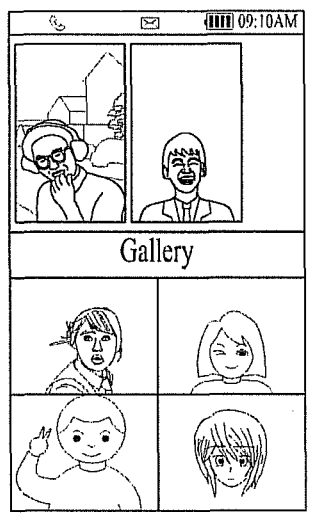
(a)
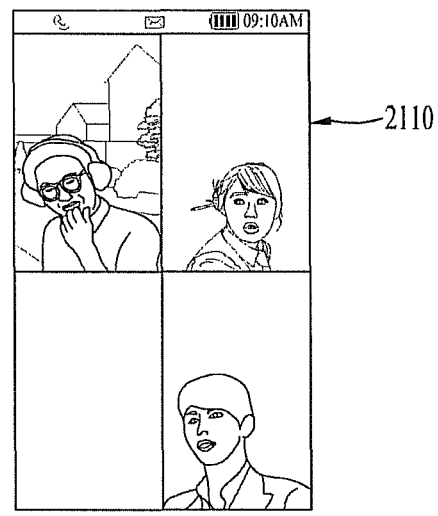
(b)

FIG. 23
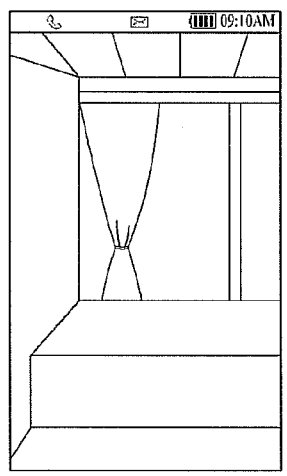
(a)
(b)
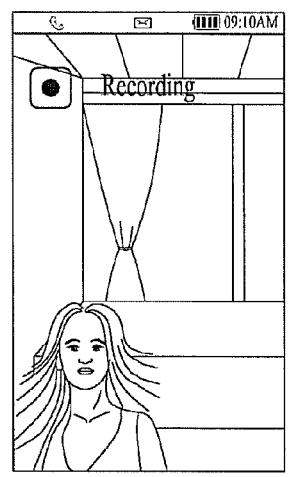
(c)

MOBILE TERMINAL AND CONTROLLING METHOD THEREOF

CROSS-REFERENCE TO RELATED APPLICATION(S)

Pursuant to 35 U.S.C. §119(a), this application claims the benefit of earlier filing date and right of priority to Korean Application No. 10-2013-0028066, filed on Mar. 15, 2013, the contents of which are hereby incorporated by reference herein in their entirety.

BACKGROUND

1. Field

The present invention relates to a mobile terminal, and more particularly, to a mobile terminal and controlling method thereof. Although the present invention is suitable for a wide scope of applications, it is particularly suitable for merging videos in the course of a video call and displaying the merged video call.

2. Background

A mobile terminal is a device which may be configured to perform various functions. Examples of such functions include data and voice communications, capturing images and video via a camera, recording audio, playing music files and outputting music via a speaker system, and displaying images and video on a display.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

A mobile terminal can perform a video call in a manner of transmitting s a video taken through its own camera to a counterpart terminal by real time and also receiving and displaying a video taken by the counterpart terminal by real time. In doing so, the mobile terminal takes a video of a user's surrounding environment while the counterpart terminal takes a video of a counterpart's surrounding environment, in general.

Occasionally, a user may request to be provided with an optical illusion as if a counterpart is located in the same environment of the user. For instance, when a plurality of users located at different places participate in a video call conference, if such an optical illusion is caused as if each of a plurality of the users is located at the same place, the participants can further focus their minds on the conference.

However, no discussion on a terminal capable of representing video call participants as located in the same space has been made yet.

SUMMARY OF THE INVENTION

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, by which user's convenience can be enhanced.

In particular, one object of the present invention is to provide a mobile terminal and controlling method thereof, by which an optical illusion can be caused as if video call participants are located in the same space.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal capable of performing a video merging in the course of a video call to a counterpart terminal according to the present invention includes a camera configured to create a first video having a user of the mobile terminal taken therein, a wireless communication unit configured to receive a second video taken by the counterpart terminal, a controller configured to extract a user display region from the first video, and merge the user display region and the second video, and a display unit configured to display the merged video.

In another aspect of the present invention, a method of controlling a mobile terminal capable of performing a video merging in the course of a video call to a counterpart terminal according to the present invention includes taking a first video through a camera, receiving a second video taken by the counterpart terminal, extracting a user display region from the first video, merging the user display region and the second video, and displaying the merged video.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The embodiments will be described in detail with reference to the following drawings in which like reference numerals refer to like elements wherein:

FIG. 5 is a diagram for one example to describe a first display window and a second display window on a touchscreen;

FIG. 11 is a diagram for one example to describe that a size of a first display window is determined by a user input;

FIG. 15 is a diagram for one example to describe an operation in case of changing an output mode of a mobile terminal;

FIG. 21 is a diagram for one example to describe that an image is displayed in substitution for a video received from a counterpart;

FIG. 23 is a diagram for one example to describe that a front video and a rear video are merged with each other in the course of a dual recording.

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipments, smart phones, digital broadcast receivers, personal digital assistants, laptop computers, portable multimedia players (PMP), navigators and the like.

Yet, it is apparent to those skilled in the art that a configuration according to an embodiment disclosed in this specification is applicable to such a fixed terminal as a digital TV, a desktop computer and the like as well as a mobile terminal.

Figure 1:
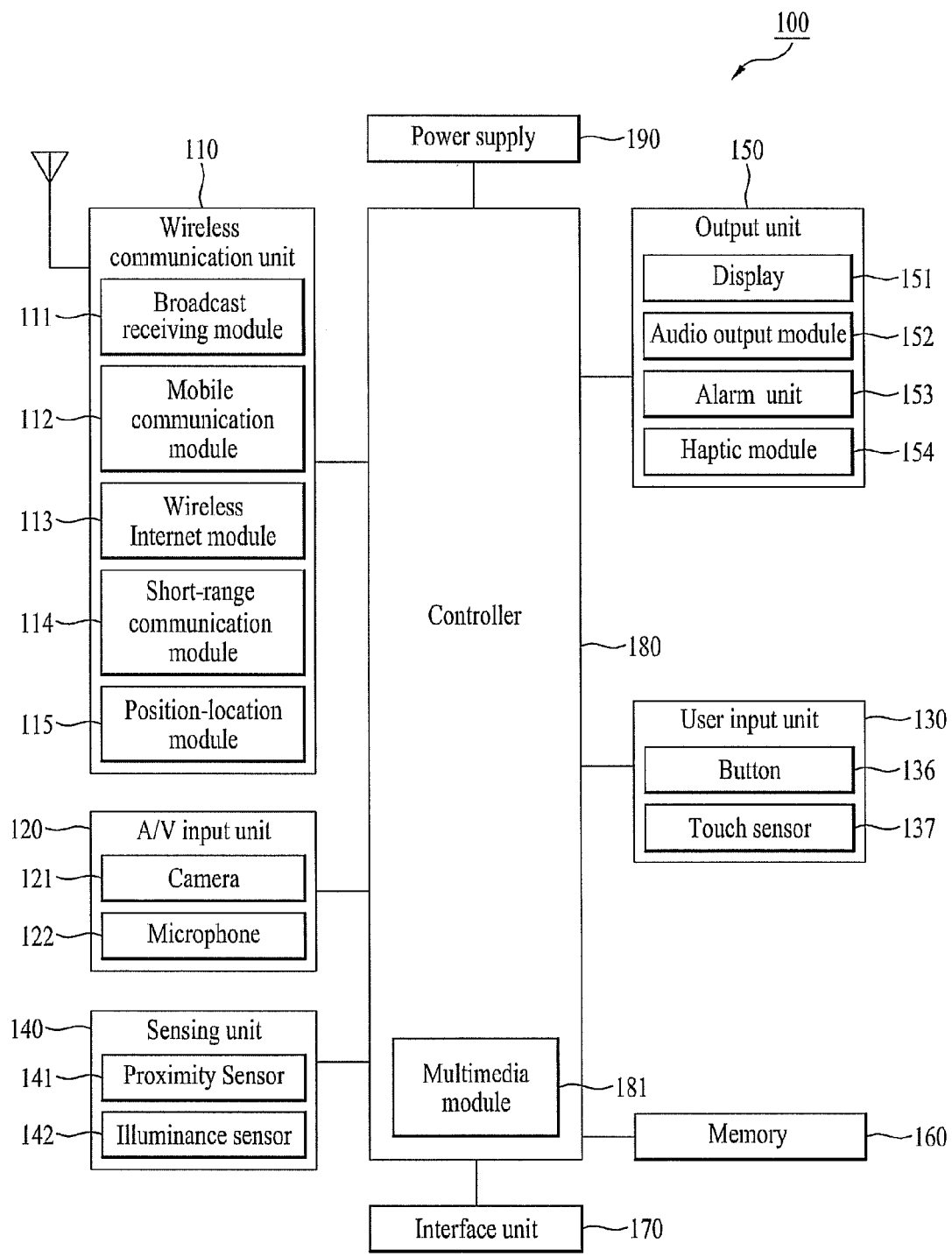
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless Internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like (not shown in the drawing).

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By non-limiting example, such sensing unit 140 include, gyro sensor, accelerate sensor, geomagnetic sensor.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Figure 2:
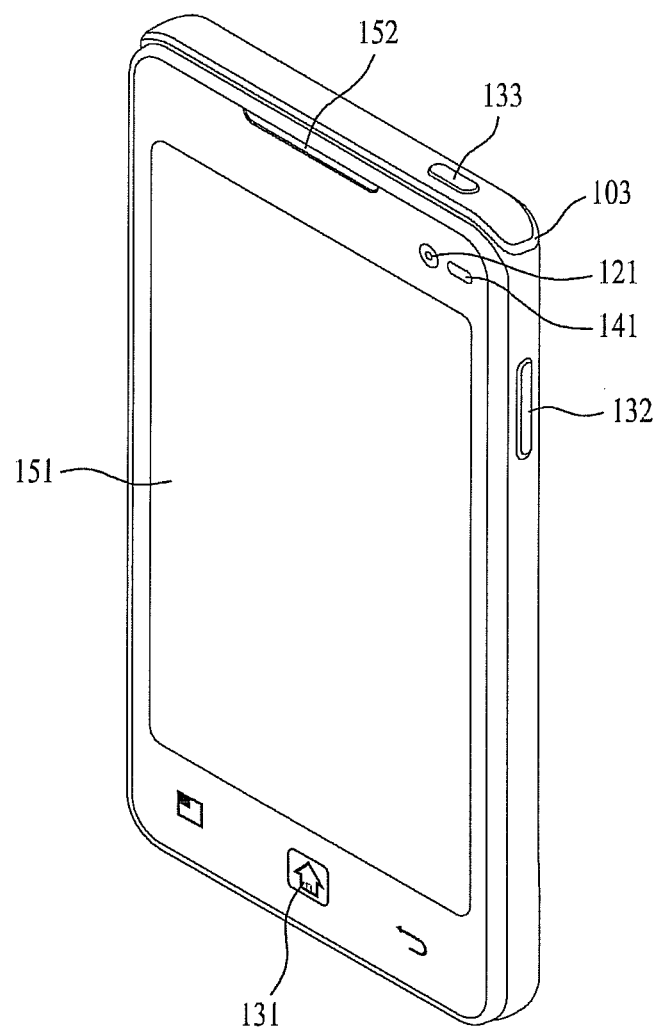
FIG. 2 is a front perspective diagram of a mobile terminal according to one embodiment of the present invention.

Referring to FIG. 2, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part as a battery, a USIM card, a memory card and the like. In doing so, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Referring to FIG. 2, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' configured to expose a camera 121' or an audio output unit 152' externally.

The cases 101, 102 and 103 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152 and the like can be inputted to the second manipulating unit 132, a command for a switching to a touch recognizing mode of the display 151 and the like can be inputted to the second manipulating unit 133.

Figure 3:
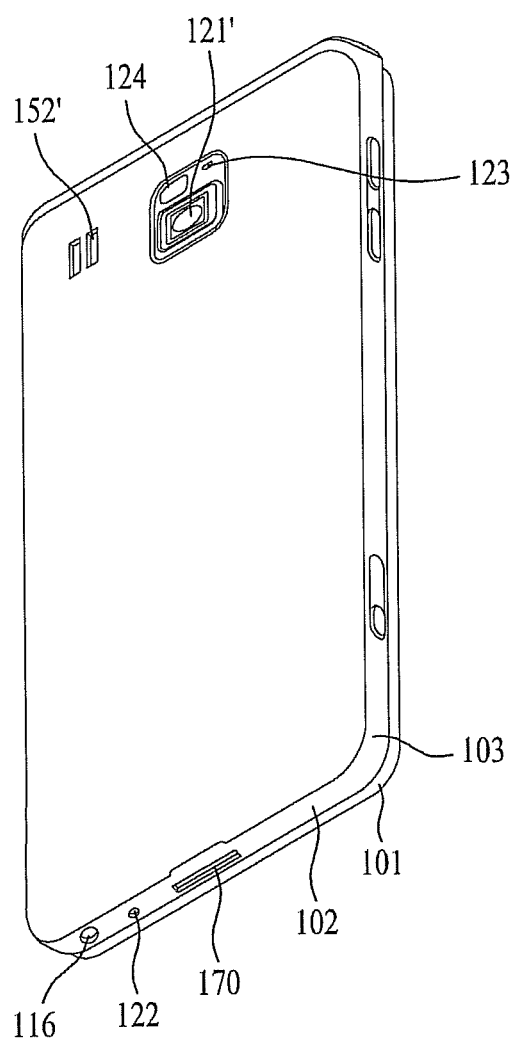
FIG. 3 is a rear perspective diagram of a mobile terminal according to one embodiment of the present invention.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121 has a photographing direction that is substantially opposite to that of the former camera 121 shown in FIG. 2 and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

In the following description, embodiments relating to a controlling method implemented in the above-configured mobile terminal shall be explained with reference to the accompanying drawings.

For clarity and convenience of the following description, assume that a mobile terminal mentioned in the following description includes at least one of the components shown in FIG. 1. In particular, assume that a mobile terminal according to the present invention includes the camera 121 configured to create a first video of photographing a user of the mobile terminal, the wireless communication unit 110 configured to receive a second video taken by real-time from a counterpart terminal, the controller 180 separating the first video into a user display region and a remaining region, the controller 180 merging the user display region of the first video and the second video with each other, and the display unit 151 configured to display the merged video. Moreover, the mobile terminal according to the present invention may further include the memory 160 configured to store data and the sensing unit 140 configured to detect a motion of the mobile terminal.

For clarity of the following description, a counterpart performing a voice call or a video call to a mobile terminal according to the present invention shall be named a counterpart terminal. Moreover, a person using the mobile terminal according to the present invention shall be named 'user' and a user of a counterpart terminal shall be named 'counterpart'.

While a mobile terminal and a counterpart perform a video call, it is well known that the mobile terminal and the counterpart can share videos taken by them with each other. For clarity of the following description, a video, which is taken by a mobile terminal and then sent to a counterpart terminal, shall be named 'first video'. And, a video, which is taken by a counterpart terminal and then sent to a mobile terminal, shall be named 'second video'.

As mentioned in the foregoing description with reference to FIG. 2 and FIG. 3, the mobile terminal according to the present invention may include at least one camera 121 (e.g., the front camera 121 and the rear camera 121'), which may exactly apply to the counterpart terminal. In order to discriminate a video taken through the front camera 121 from a video taken through the rear camera 121', the video taken through the front camera 121 may be named 'front video' and the video taken through the rear camera 121' may be named 'rear video'. Hence, a video taken through the front camera 121 of the mobile terminal may be named a first front video, while a video taken through a front camera of the counterpart terminal may be named a second front video.

Instead of discriminating a front video and a rear video from each other, when a terminology 'video' is used, the terminology may be understood as meaning one of the front video or the rear video or indicating a general term of each of the front video and the rear video in accordance with a context. Although it is not necessary to discriminate the front camera 121 and the rear camera 121' from each other, a terminology 'video' can be used on behalf of a terminology 'front video' or 'rear video'.

If the display module or unit 151 of the mobile terminal according to the present invention includes a touchscreen, implementation of the following embodiments may be further facilitated. Therefore, the following description is made on the assumption that the display module or unit 151 includes the touchscreen. If the display unit 151 does not include the touchscreen, the mobile terminal according to the present invention may further include a separate input device (e.g., the user input unit 130) configured to receive a user input.

Based on the above-mentioned assumptions, operations of a mobile terminal according to the present invention are explained in detail as follows.

Figure 4:
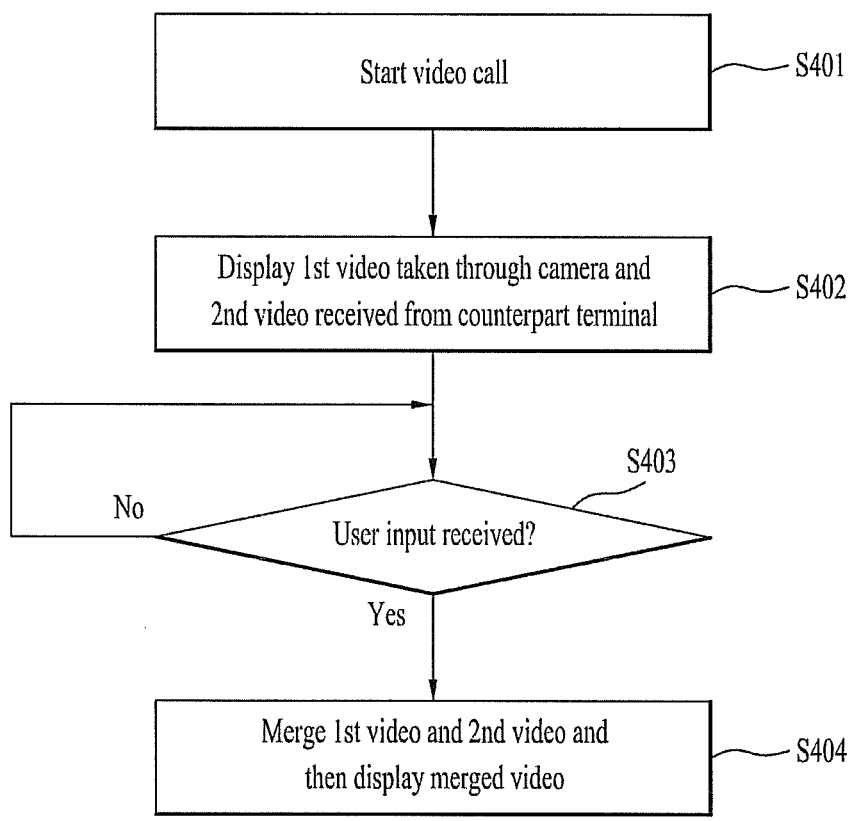
FIG. 4 is a flowchart for an operation of a mobile terminal according to the present invention.

FIG. 4 is a flowchart for an operation of a mobile terminal according to the present invention.

Referring to FIG. 4, once a video call between the mobile terminal and the counterpart terminal starts (S401), the controller 180 activates the camera 121 and is able to control the touchscreen to display a first video taken through the camera 121 and a second video received from the counterpart terminal (S402). Generally, since a user of the mobile terminal makes a video call while watching the touchscreen provided to the front side of the mobile terminal, the controller 180 activates the front camera 121 rather than the rear camera 121' and preferably controls a first front video taken through the front camera 121 to be displayed. Yet, after the rear camera 121' has been activated in the first place, a first rear video taken through the rear camera 121' can be set to be displayed. In both of the cases, while the video call is in progress, based on a user input, activations of the front camera 121 and the rear camera 121' can be switched to each other or both of the front camera 121 and the rear camera 121' can be simultaneously activated. In case that both of the front camera 121 and the rear camera 121' are simultaneously activated, both of the first front video and the first rear video can be simultaneously displayed on the touchscreen together with the second video received from the counterpart terminal.

The activation switching between the front camera 121 and the rear camera 121' may be requested by the counterpart terminal. For instance, after the front camera 121 of the mobile terminal has been activated, while the first front video is sent to the counterpart terminal, if the counterpart terminal makes a request for the activation of the rear camera 121', the controller 180 can control the first rear video to be sent to the counterpart terminal instead of the first front video by activating the rear camera 121' as soon as deactivating the front camera 121. For another instance, after the rear camera 121' of the mobile terminal has been activated, while the first rear video is sent to the counterpart terminal, if the counterpart terminal makes a request for the activation of the front camera 121, the controller 180 can control the first front video to be sent to the counterpart terminal instead of the first rear video by activating the front camera 121 as soon as deactivating the rear camera 121'.

As the video call has started, in case of attempting to display the first video and the second video on the touchscreen, the first video may be displayed through a first display window and the second video may be displayed through a second display window. Generally, a user making a video call is further interested in a video (i.e., a second video) received from a counterpart terminal rather than a video (e.g., a first video) of the user himself. Hence, in general, a size of the second display window for displaying the second video may be larger than the first display window or the first display window may be represented as a PIP (picture in picture) of the second display window.

FIG. 5 is a diagram for one example to describe a first display window and a second display window on a touchscreen.

Referring to FIG. 5, a first display window 510 for displaying a first video may be smaller than a second display window 520 for displaying a second video (FIG. 5 (*a*)). Alternatively, a first display window 510 for displaying a first video may be represented as a PIP (picture in picture) of a second display window 520 for displaying a second video (FIG. 5 (*b*)).

Unlike the example shown in FIG. 5, it is a matter of course that the controller 180 can set a size of the first display window 510 to be equal to or greater than that of the second display window 520. In any cases, it may be unnecessary for sizes and display locations of the first and second display windows 510 and 520 to be fixed. Instead, the sizes and display locations of the first and second display windows 510 and 520 are flexibly variable.

For clarity of the following description with reference to the accompanying drawings, assume that a first display window for displaying a first video is a PIP of a second display window for displaying a second video.

Referring now to FIG. 4, after the video call has started, while the first video and the second video are displayed through the touchscreen, if a user input for merging the first video and the second video is received (S403), the controller 180 can control the touchscreen to display a video created from merging the first video and the second video (S404). In this case, the video created from merging the first video and the second video may be configured in a manner that the first video is layered over the second video. In particular, the first video and the second video may configure a first layer and a second layer, respectively. Based on a user input, the controller 180 may be set to control either the first layer or the second layer.

A process for merging a first video and a second video is described in detail with reference to the accompanying drawings as follows.

Figure 6:
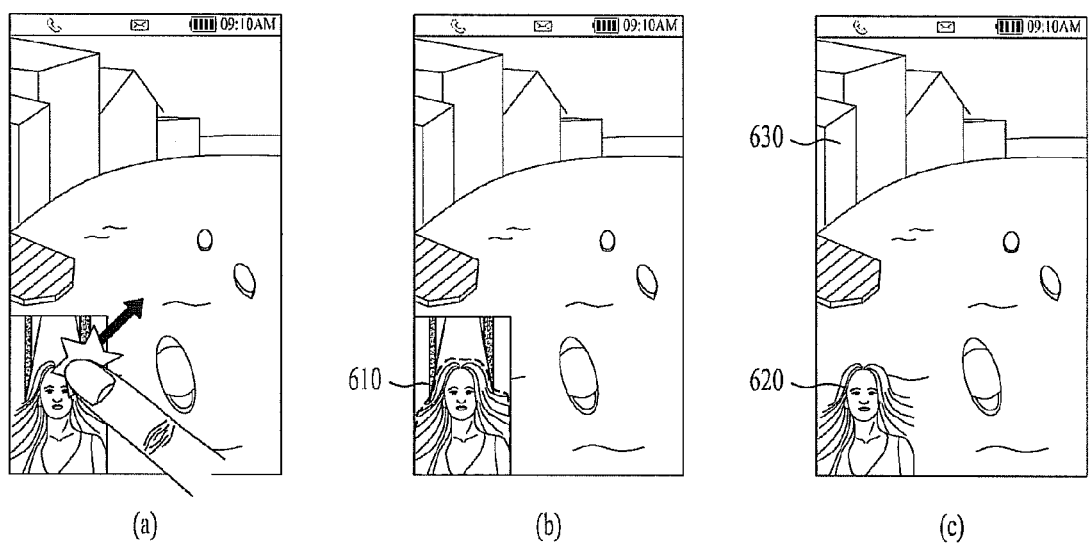
FIG. 6 is a diagram for one example to describe that a first video and a second video are merged with each other.

FIG. 6 is a diagram for one example to describe that a first video and a second video are merged with each other. For clarity of the following description, assume that a drag input from a first display window for displaying a first video to a second display window for displaying a second video is a user input for merging the first video and the second video. Yet, the user input for merging the first video and the second video may be non-limited by the drag input. For instance, a drag input from a first display window for displaying a first video to a second display window for displaying a second video can be implemented with one of various methods including a single touch (e.g., an action of touching a random point once like a mouse click) to at least one of a first display window and a second display window, a double tap (e.g., an action of touching a same point quickly twice like a double click) to at least one of a first display window and a second display window, a long touch (e.g., an action of maintaining a touch for a long time) to at least one of a first display window and a second display window, a proximity touch at least one of a first display window and a second display window, a drag input to at least one of a first display window and a second display window, a flicking input to at least one of a first display window and a second display window, a drag input to at least one of a first display window and a second display window, a combination of at least two of the above-enumerated inputs to at least one of a first display window and a second display window, and the like.

Referring to FIG. 6, if a drag input from a first display window for displaying a first video to a second display window for displaying a second video is received (FIG. 6 (*a*)), the controller 180 can separate the first video into a user display region and a remaining region (FIG. 6 (*b*)). In particular, like the example shown in FIG. 6 (*b*), the controller 180 can separate the first video into a user display region (e.g., a region inside a dotted line 610 shown in FIG. 6 (*b*)) and a remaining region (e.g., a region outside the dotted line 610 shown in FIG. 6 (*b*)) along an outline of a user.

Subsequently, referring to FIG. 6 (*c*), the controller 180 crops the user display region from the first video, merges the cropped video 620 and the second video 630 with each other, and then controls the touchscreen to display the merged video. In particular, the controller 180 sets the video 620 cropped from the first video and the second video 630 as a first layer and a second layer, respectively and then controls the first layer to be located above the second layer, thereby controlling the first video and the second video to be merged. Hence, the merged video can be displayed as a video created from cutting the remaining region except the user display region from the first video taken by real time through the camera 121 of the mobile terminal using the second video received from the counterpart terminal as a background. The user display region extracted from the first video is not a still image but may have a video format. Hence, the user display region may reflect a user's motion by real time. In order to extract the user display region from the first video, the controller 180 may be able to display the user display region along a user's outline in each frame of the first video created by real time through the camera or each unit interval frame.

In case that a third party is taken as a first video together with a user of the mobile terminal, the controller 180 can merge a display region of at least one of the user of the mobile terminal and the third party with a second video. This is described in detail with reference to FIG. 7 as follows.

Figure 7:
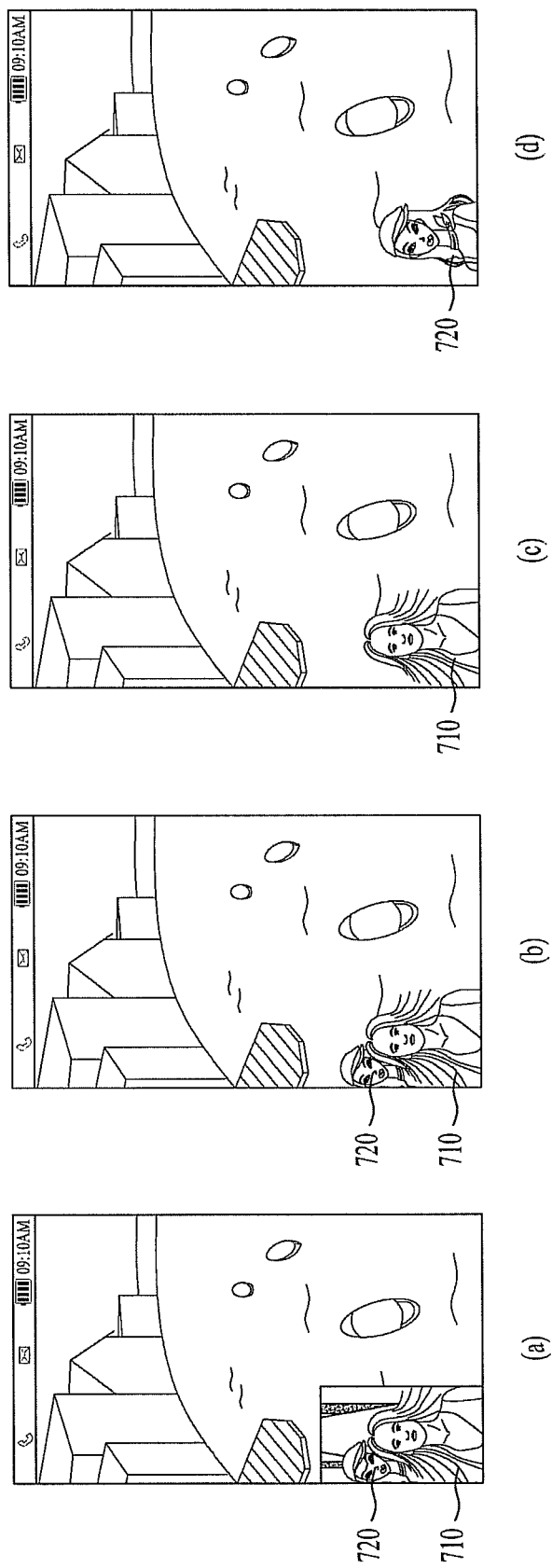
FIG. 7 is a diagram for one example to describe that a first video having a plurality of persons taken therein is merged with a second video.

FIG. 7 is a diagram for one example to describe that a first video having a plurality of persons taken therein is merged with a second video.

Referring to FIG. 7, for clarity of the following description, like the example shown in FIG. 7 (*a*), assume that a user (i.e., a person located at a left side in a first video) of the mobile terminal and a third party (i.e., a person located at a right side in the first video) are taken in the first video.

In case that a user input for intending to merge a first video having a plurality of persons taken therein and a second video is applied, referring to FIG. 7 (*b*), the controller 180 can control both a mobile terminal user display region 710 and a third party display region 720 to be merged with a second video. In this case, the user display region 710 may be extracted along an outline of the taken user 410 and the third party display region 720 may be extracted along an outline of the taken third party 420.

On the other hand, referring to FIG. 7 (*c*), the controller 180 can control the user display region 710, which is selected from the user display region 710 and the third party display region 720, to be merged with the second video. Moreover, referring to FIG. 7 (*d*), the controller 180 can control the third party display region 720, which is selected from the user display region 710 and the third party display region 720, to be merged with the second video.

In the example shown in FIG. 7 (*c*) or FIG. 7 (*d*), which one of the user display region 710 and the third party display region 720 will be merged with the second video can be selected by a user. For instance, if the user selects the user display region 710 from the user display region 710 and the third party display region 720, the user display region 710 and the second video will be merged with each other (FIG. 7 (*c*)). If the user selects the third party display region 720, the third party display region 720 and the second video will be merged with each other (FIG. 7 (*d*)). For another instance, after both of the user display region 710 and the third party display region 720 in the first video have been merged with the second video, the controller 180 controls at least one of the user display region 710 and the third party display region 720 to stop being merged based on a user input, thereby controlling the screen shown in FIG. 7 (*b*) to be switched to the screen shown in FIG. 7 (*c*) or FIG. 7 (*d*), and vice versa.

A user input for intending to delete at least one of the user display region 710 and the third party display region 720 from the merged video may be implemented in various ways including a single touch to a display region to delete, a double tap to a display region to delete, a long touch to a display region to delete, a proximity touch to a display region to delete, a flicking input from an inside of a display region to delete toward an outside, a zigzagged touch to a display region to delete, a combination of at least two of the above-enumerated inputs, and the like.

Unlike the above-described embodiment, the controller 180 can control a user photographed region, which corresponds to the user display region 710 or the third party display region 720, to be automatically merged with the second video. In doing so, the controller 180 determines that a display region of a person located closest to the mobile terminal among a plurality of persons taken in the first video is the user display region 710 and is then able to determine a photographed region of other persons as a photographed region of a third party.

In particular, it is able to determine the display region of the person located closest to the mobile terminal based on a size of a per-person display region or a presence or non-presence of overlapping between per-person display regions. For instance, a per-person display region having a greatest size among the per-person display regions may be handled as the user display region 710. For another instance, a photographed region of a person free from being blocked by a photographed region of another person despite blocking the photographed region of another person may be handled as the user display region 710.

From now on, assume a case that a third party is taken in a second video received from a counterpart terminal as well as a counterpart. In case of merging the second video having the third party taken therein as well as the counterpart, who uses the counterpart terminal, with a first video, the controller 180 can control the second video to be merged with the first video without being edited. Moreover, the controller 180 deletes a display region of at least one of the counterpart and the third party from the second video and is then able to control the corresponding second video to be merged with the first video. This is described in detail with reference to FIG. 8 as follows.

Figure 8:
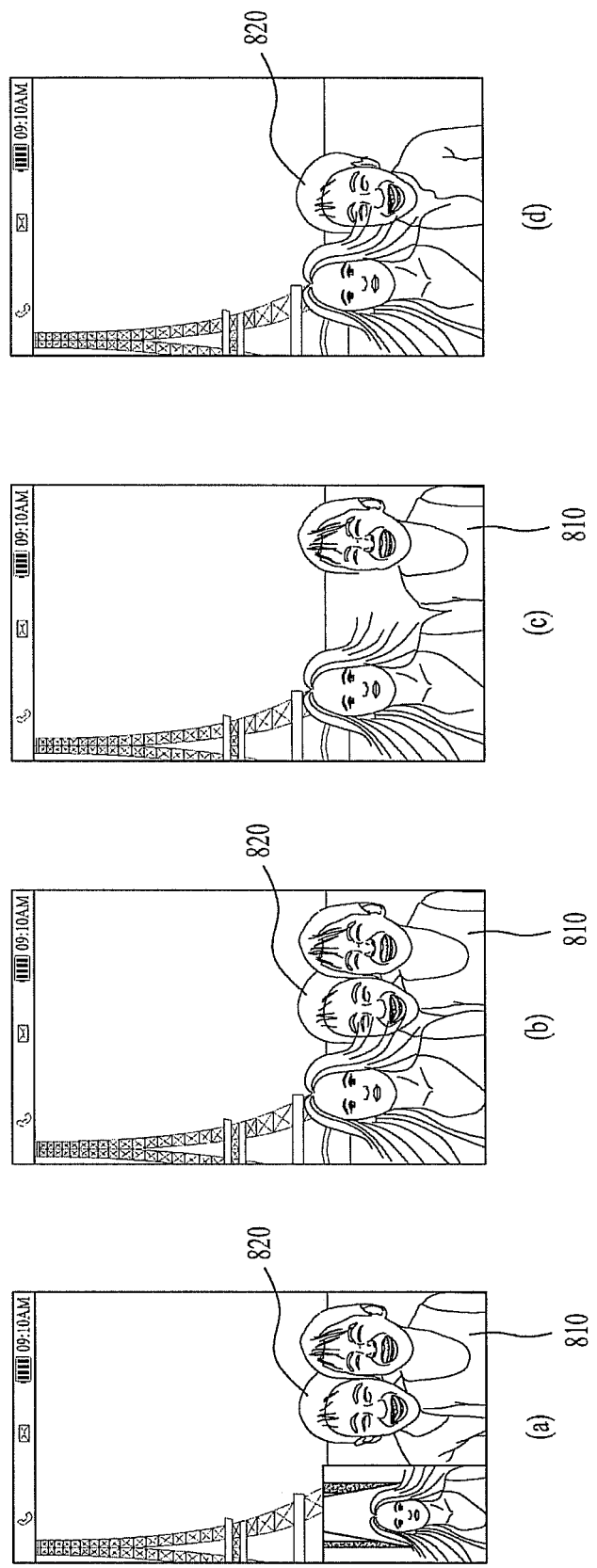
FIG. 8 is a diagram for one example to describe that a first video and a second video having a plurality of persons taken therein are merged with each other.

FIG. 8 is a diagram for one example to describe that a first video and a second video having a plurality of persons taken therein are merged with each other.

Referring to FIG. 8, for clarity of the following description, assume that a counterpart (e.g., a person located at a right side in a second video) and a third party (e.g., a person located at a right side in the second video) are taken in the end video (FIG. 8 (*a*)).

If a user input for intending to merge a first video and a second video having a plurality of persons taken therein is applied, referring to FIG. 8 (*b*), the controller 180 can control a photographed region of a user extracted from the first video and the second video to be merged with each other. In particular, the controller 180 can control the first video and the second video to be merged with each other irrespective of whether a plurality of persons appear in the second video.

On the other hand, referring to FIG. 8 (*c*), the controller 180 can control the second video, from which a third party display region 820 is deleted, to be merged with the first video. In this case, the second video includes the counterpart display region 810 and a third party display region 820. Moreover, referring to FIG. 8 (*d*), the controller 180 can control the second video, from which the counterpart display region 810 is deleted, to be merged with the first video. In this case, the second video includes the counterpart display region 810 and a third party display region 820. Besides, the controller 180 can control the second video, from which the counterpart display region 810 and the third party display region 820 are deleted, to be merged with the first video [not shown in the drawing].

In the example shown in FIG. 8 (*c*) or FIG. 8 (*d*), it is able to perform the step of deleting one of the counterpart display region 810 and the third party display region 820 from the second video based on a user selection. For instance, if the user of the mobile terminal, which receives the second video from the counterpart terminal and displays the received second video, gives a command for deleting the counterpart display region 810 and the third party display region 820 from the second video, referring to FIG. 8 (*c*), the first video and the second video, from which the third party display region 820 is deleted, will be merged with each other. If the user of the mobile terminal gives a command for deleting the counterpart display region 810 from the second video, referring to FIG. 8 (d), the first video and the second video, from which the counterpart display region 810 is deleted, will be merged with each other. For another instance, after the second video, from which none of the counterpart display region 810 and the third party display region 820 is deleted, and the first video have been merged with each other, the controller 180 can control at least one of the counterpart display region 810 and the third party display region 820 to be deleted based on a user input. In particular, the controller 180 can control an output of the touchscreen to be changed into the screen shown in FIG. 8 (c) or FIG. 8 (d) from the screen shown in FIG. 8 (b), and vice versa.

The user input for intending to delete at least one of the user display region 810 and the third party display region 820 from the merged video may be implemented in various ways including a single touch to a display region to delete, a double tap to a display region to delete, a long touch to a display region to delete, a proximity touch to a display region to delete, a flicking input from an inside of a display region to delete toward an outside, a zigzagged touch to a display region to delete, a combination of at least two of the above-enumerated inputs, and the like.

Unlike the above-described embodiment, the controller 180 can control the third party display region 820, which is selected from the counterpart display region 810 and the third party display region 820, to be automatically deleted from the second video. In doing so, the controller 180 determines that a display region of a person located closest to the mobile terminal among a plurality of persons taken in the second video is the counterpart display region 810 and is then able to determine a photographed region of other persons as a photographed region of a third party.

In particular, it is able to determine the display region of the person located closest to the mobile terminal based on a size of a per-person display region or a presence or non-presence of overlapping between per-person display regions. For instance, a per-person display region having a greatest size among the per-person display regions may be handled as the counterpart display region 810. For another instance, a photographed region of a person free from being blocked by a photographed region of another person despite blocking the photographed region of another person may be handled as the counterpart display region 810.

In case that at least one of the counterpart display region 810 and the third party display region 820 is deleted from the second video, the controller 180 may control the deleted part to be processed into a blank. Alternatively, the controller 180 may control the deleted display region to be automatically filled based on a background of a surrounding part of the deleted region. In the example shown in FIG. 8 (c) or FIG. 8 (d), the deleted display region is automatically filled depending on the background of the surrounding part.

In a video created from merging a user display region of a first video and a second video with each other, the controller 180 can enlarge or reduce the user display region extracted from the first video based on a user input. Moreover, the controller 180 can enlarge or reduce the second video utilized as a background in the merged video based on a user input. This is described in detail with reference to FIG. 9 as follows.

Figure 9:
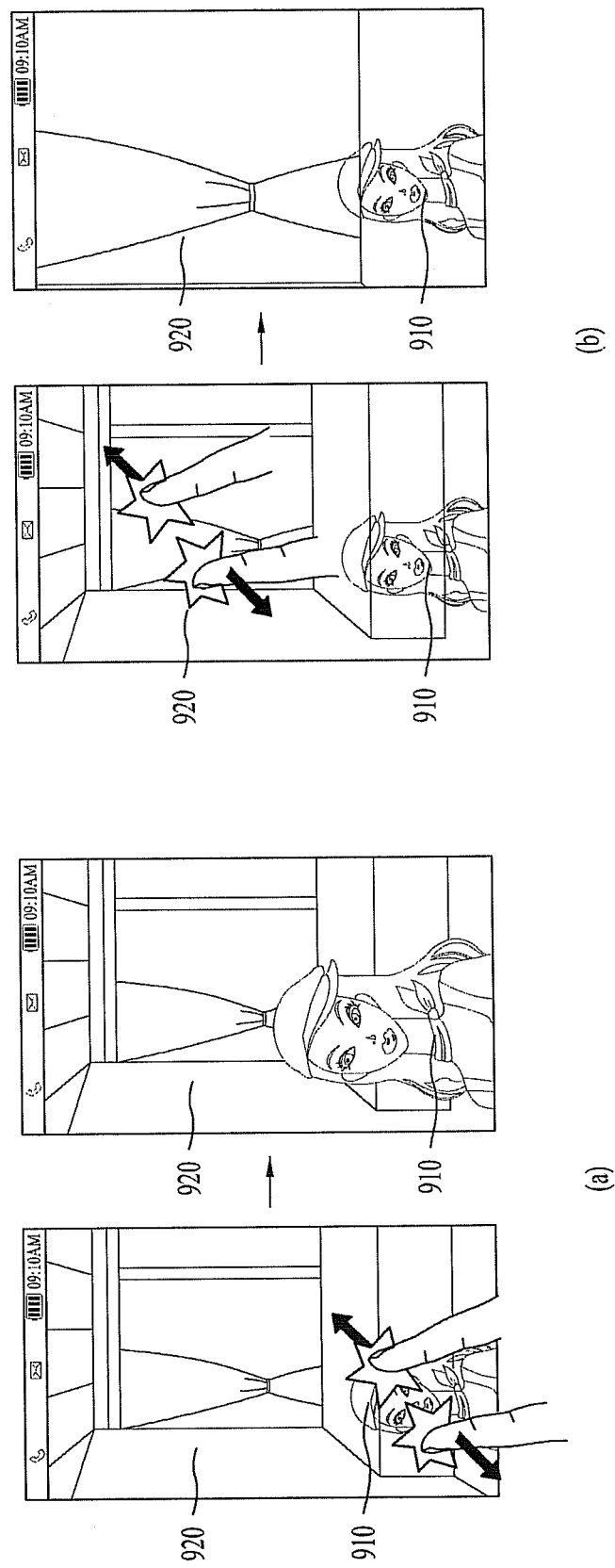
FIG. 9 is a diagram for one example to describe enlargement and reduction of a user display region of a first video or a second video used as a background in a merged video.

FIG. 9 is a diagram for one example to describe enlargement and reduction of a user display region of a first video or a second video used as a background in a merged video.

Referring to FIG. 9, if a user's enlargement and reduction command is inputted to a user display region 910 of a first video corresponding to a first layer of a merged video, the controller 180 discriminates the first layer and a second layer from each other and is then able to control the user display region 910 of the first video set as the first layer to be enlarged or reduced without enlarging or reducing a second video 920 set as the second layer. For instance, referring to FIG. 9 (a), if a pinch-out input is applied to the user display region 910 in the merged video, the controller 180 is able to control the user display region 910 to be enlarged and displayed by maintaining a ratio of the second video 920. For another instance, if a pinch-in input is applied to the user display region 910 in the merged video, the controller 180 is able to control the user display region 910 to be reduced and displayed by maintaining a ratio of the second video 920 (not shown in the drawing).

In this case, 'pinch-in' may be understood as an action of decreasing a distance between two fingers by maintain a contact touch or proximity touch to the touchscreen with the two pointers. And, 'pinch-out' may be understood as an action of increasing a distance between two fingers by maintaining a contact touch or proximity touch to the touchscreen with the two pointers.

On the other hand, if a user's enlargement and reduction command is inputted to the second layer of the merged video, the controller 180 discriminates the first layer and the second layer from each other and is then able to control the second video 920 set as the second layer to be enlarged or reduced without enlarging or reducing the user display region 910 set as the first layer. For instance, referring to FIG. 9 (b), if a pinch-out input is applied to the second video 920 in the merged video, the controller 180 is able to control the user display region 910 to be enlarged and displayed by maintaining a ratio of the user display region 910 of the first video. For another instance, if a pinch-in input is applied to the second video 920, the controller 180 is able to control the user display region 910 to be reduced and displayed by maintaining a ratio of the user display region 910 of the first video (not shown in the drawing).

Like the example shown in FIG. 9, the controller 180 controls the merged video to be configured with a structure in which the first layer corresponding to the user display region 910 and the second layer corresponding to the second video 920 (i.e., a background video) are layered, thereby enabling each of the layers to be enlarged or reduced individually. Moreover, it is a matter of course that the controller 180 can control both of the first layer and the second layer to be enlarged or reduced based on a user's enlargement or reduction command [not shown in the drawing].

In particular, for example, the controller 180 can select a target to enlarge or reduce from the first layer and the second layer depending on initial contact locations of two pointers for inputting a pinch-in or a pinch-out. In case that both of the two pointers for inputting the pinch-in or pinch-out are initially located at the first layer, the controller 180 can control the first layer to be reduced or enlarged only in response to the pinch-in or pinch-out action. On the other hand, in case that both of the two pointers for inputting the pinch-in or pinch-out are initially located at the second layer, the controller 180 can control the second layer to be reduced or enlarged only in response to the pinch-in or pinch-out action. For another example, in case that the two pointers for inputting the pinch-in or pinch-out are initially located at the first layer and the second layer, respectively, the controller 180 can control both of the first layer and the second layer to be reduced or enlarged in response to the pinch-in or pinch-out action.

According to the above-described embodiments, a user input for intending to reduce or enlarge at least one portion of a merged video includes a pinch-in or a pinch-out for clarity of the corresponding description, by which the present invention may be non-limited. For instance, various user inputs including a double-tap, a drag input and the like can be used as user inputs for reducing or enlarging at least one portion of a video as well as the pinch-in or -out.

The controller 180 adjusts a location of a first layer in response to a user input, thereby controlling a location of a user display region in a merged video to be adjusted. This is described in detail with reference to FIG. 10 as follows.

Figure 10:
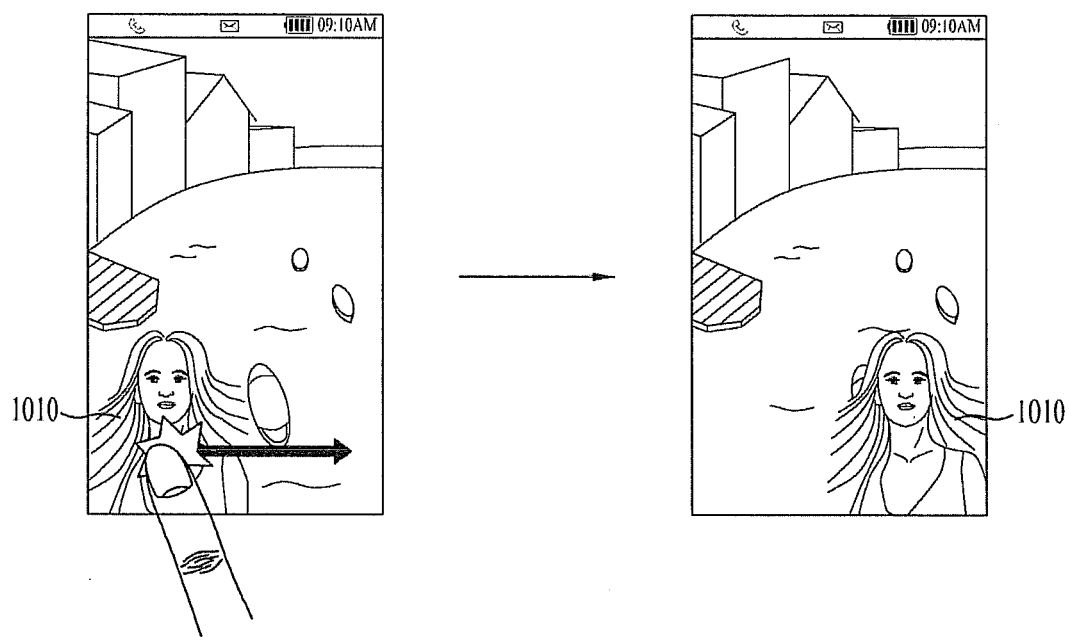
FIG. 10 is a diagram for one example to describe that a location of a user display region in a merged video is adjusted.

FIG. 10 is a diagram for one example to describe that a location of a user display region in a merged video is adjusted.

Referring to FIG. 10, if a user display region 1010 is dragged & dropped onto a random point, the controller 180 can control a display location of the user display region 1010 to be changed into the dropped point.

A video created from merging a first video and a second video with each other can be shared with a counterpart terminal that is a video call counterpart. To this end, the controller 180 sends a merging complete message indicating that the first video and the second video have been merged with each other to the counterpart terminal and is then able to receive a sharing message in response to the merging complete message. In this case, the merging complete message may be used to inquire whether the counterpart terminal will share the merged video. And, the sharing message may be used to inform the mobile terminal whether the counterpart terminal will share the merged video.

In case that the counterpart terminal in the course of the video call to the mobile terminal determines not to share the merged video, the controller 180 can control the first video to be transmitted to the counterpart terminal in the manner of the related art. On the other hand, in case that the counterpart terminal in the course of the video call to the mobile terminal determines to share the merged video, the controller 180 can control the merged video to be transmitted to the counterpart terminal in substitution for the first video.

According to another embodiment of the present invention, even if the counterpart terminal determines to share the merged video, the controller 180 can control the first video to be transmitted to the counterpart terminal instead of the merged video. In this case, the counterpart terminal can create a video from merging the first video and the second video by itself using its hardware and software resources.

If a user input for interrupting the video merging is received in the course of displaying the merged video, as mentioned in the foregoing description with reference to FIG. 5, the controller 180 interrupts the merging of the first and second videos and is then able to control the first video and the second video to be displayed through the first display window and the second display window, respectively. In this case, the user input for interrupting the video merging may include one of a shaking motion of shaking the mobile terminal, a touch input of drawing an imaginary line to divide the touchscreen into two equal parts.

After the action of shaking the mobile terminal has been set as the user input for interrupting the video merging, if the sensing unit 140 detects the action of shaking the mobile terminal, the controller 180 interrupts the merging of the first and second videos and is then able to control the first video and the second video to be displayed through the first display window and the second display window, respectively.

After the touch input of drawing the imaginary line for dividing the touchscreen into two equal parts has been set as the user input for interrupting the video merging, if the touch input of dividing the touchscreen into the two equal parts is applied, the controller 180 interrupts the merging of the first and second videos and is then able to control the first video and the second video to be displayed through the first display window and the second display window, respectively.

In doing so, a size of the first display window for displaying the first video may be determined by an imaginary line corresponding to a trace of the touch input of dividing the touchscreen into the two equal parts. This is described in detail with reference to FIG. 11 as follows.

FIG. 11 is a diagram for one example to describe that a size of a first display window is determined by a user input.

Referring to FIG. 11, while a video created from merging a first video and a second video is displayed, if a touch input of dividing the touchscreen into two equal parts is received from a user, the controller 180 interrupts the merging of the first and second videos and is then able to control the first video and the second video to be displayed through a first display window and a second display window, respectively (FIG. 11 (a)). In doing so, the controller 180 can control a height of the first display window to become equal to or smaller than a shorter one of a distance d1 between an imaginary line 1110 of dividing the touchscreen into the two equal parts and a top end portion of the touchscreen and a distance d2 between the imaginary line 1110 and a bottom end portion of the touchscreen. For instance, referring to FIG. 11 (b), since the distance d1 between the imaginary line 1110 and the top end portion of the touchscreen is greater than the distance d2 between the imaginary line 1110 and the bottom end portion of the touchscreen, the height of the first display window may be limited to a value equal to or smaller than the distance d2 between the imaginary line 1110 and the bottom end portion of the touchscreen.

According to the above-described embodiments, a user input for intending to interrupt a video merging includes a shaking action (or motion) or a touch input of drawing an imaginary line of dividing the touchscreen into two equal parts for example. Moreover, it is a matter of course that the user input for intending to interrupt the video merging can be further configured in various ways. For instance, the controller 180 can control a button to be displayed on the touchscreen to interrupt a merging of a first video and a second video. If the button displayed on the touchscreen is touched, the controller 180 can determine that the user input for intending to interrupt the video merging is inputted.

As mentioned in the foregoing description, the controller 180 can merge a first video and a second video in a manner of extracting a user display region from the first video and then controlling the extracted user display region to be displayed on the second video. In this case, the second video may include an image taken using a front camera of a counterpart terminal or an image taken using a rear camera of the counterpart terminal. While the video created from merging the first video and the second video is displayed, if an input for switching the camera of the counterpart terminal is received from a user, the controller 180 can make a request for sending an image taken through a different camera to the counterpart terminal. For instance, if the second video includes a second front video taken using a front camera of the counterpart terminal, the controller 180 can make a request for sending a second rear video taken using a rear camera 121' instead of the front camera 121 to the counterpart terminal. If the counterpart terminal accepts the request and then sends the second rear video, a merging target of the first video can be automatically switched to the second rear video from the second front video. In this case, the user input for the switching of the counterpart terminal can be implemented in various ways including a flocking input, a 360° rotating motion of the mobile terminal and the like.

The mobile terminal according to the present invention simultaneously activates the front camera 121 and the rear camera 121' in the course of a video call to a counterpart terminal and is then able to control both a first front video and a first rear video to be simultaneously taken. And, the mobile terminal may be set to receive a plurality of videos including a second front video and a second rear video from the counterpart terminal. Even if the mobile terminal takes a plurality of videos or receives a plurality of videos from the counterpart terminal, the former embodiment described with reference to FIG. 4 is applicable thereto. In the following description, a video merging process in a mobile terminal, which takes a plurality of videos or receives a plurality of videos in the course of a video call, is described with reference to FIG. 12. For clarity of the following description, assume that the mobile terminal receives both a second front video taken through a front camera of a counterpart terminal and a second rear video taken through a rear camera of the counterpart terminal while taking a first front video through the front camera 121 and a first rear video through the rear camera 121' simultaneously. In this case, assume that the first front video and the second front video are created from photographing a user and a counterpart, who are participating in the video call, respectively.

Figure 12:
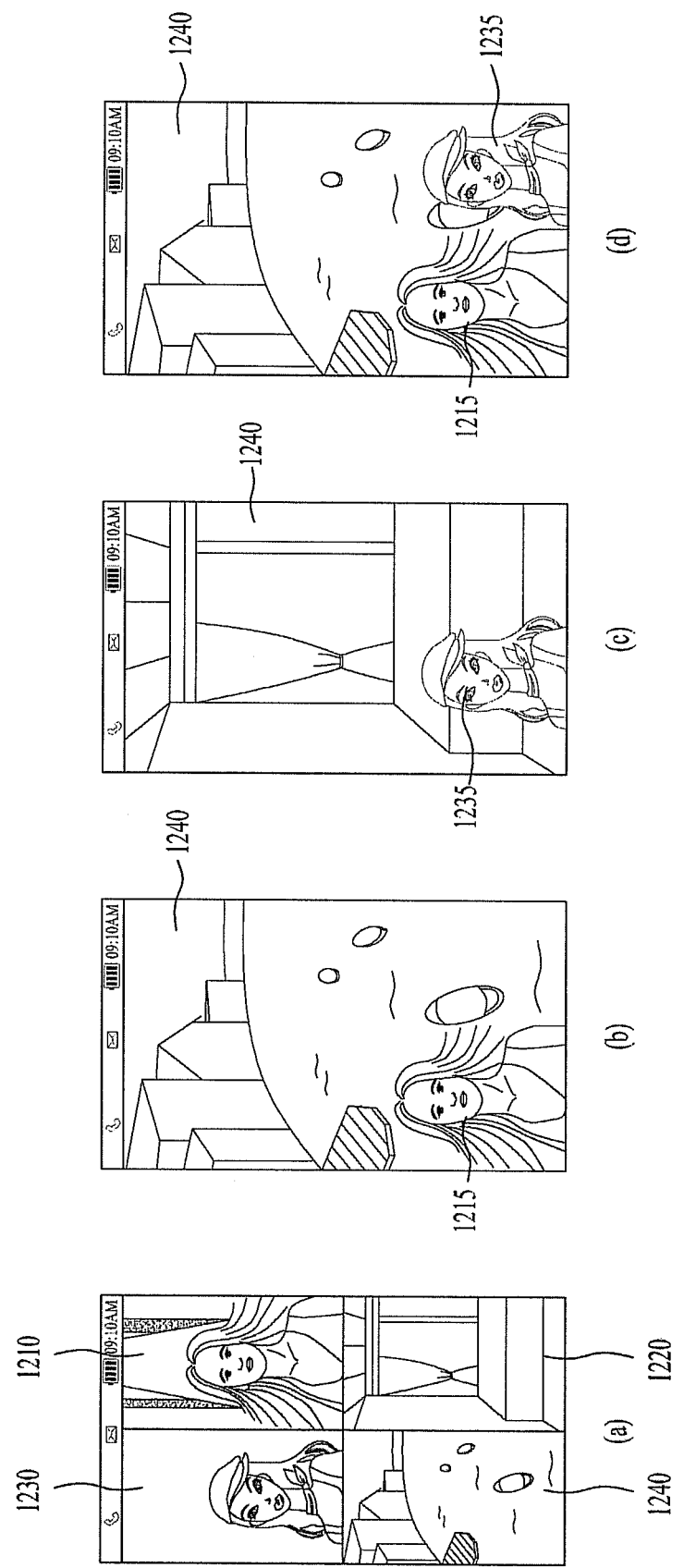
FIG. 12 is a diagram for one example to describe a process for creating a merged video.

FIG. 12 is a diagram for one example to describe a process for creating a merged video.

Referring to FIG. 12 (a), while a video call to a counterpart terminal is in progress, the controller 180 partitions the touchscreen into 4 regions and is then able to control a first front video 1210, a first rear video 1220, a second front video 1230 and a second rear video 1240 to be displayed through the 4 regions, respectively. In the example shown in FIG. 12 (a), assume that the second front video 1230, the first front video 1210, the first rear video 1220 and the second rear video 1240 are arranged on the 4 regions by starting with a left top part of the touchscreen clockwise, respectively.

Subsequently, referring to FIG. 12 (b), if a user input for merging the first front video 1210 having a user taken therein and the second rear video 1240 is received, the controller 180 merges a user display region 1215 of the first front video 1210 and the second rear video 1240 and is then able to control the touchscreen to display the merged video.

On the other hand, referring to FIG. 12 (c), if a user input for merging the second front video 1230 having a counterpart taken therein and the first rear video 1220 is received, the controller 180 merges a counterpart display region 1235 of the second front video 1230 and the first rear video 1220 and is then able to control the touchscreen to display the merged video.

Moreover, it is able to merge at least two or more videos in accordance with various combination examples. For instance, the controller 180 can merge the first front video and the second front video. In case of merging the first front video and the second front video, the controller 180 controls a user display region extracted from the first front video to be displayed using the second front video as a background or may control a counterpart display region extracted from the second front video to be displayed using the first front video as a background. Although persons are not taken in the first rear video and the second rear video in FIG. 12, respectively, if persons are taken in the first rear video and the second rear video, respectively, it may be able to merge the first rear video and the second rear video. In particular, the controller 180 may merge the first rear video and the second rear video in a manner of displaying a user display region extracted from the first rear video using the second rear video as a background or displaying a counterpart display region extracted from the second rear video using the first rear video as a background.

Besides, the controller 180 can merge the first front video and the first rear video or can merge the second front video and the second rear video. In doing so, the controller 180 can merge the first front video and the first rear video in a manner of displaying a user display region extracted from the first front video using the first rear video as a background. And, the controller 180 can merge the second front video and the second rear video in a manner of displaying a counterpart display region extracted from the second front video using the second rear video as a background.

The mobile terminal according to the present invention can merge at least 3 or more videos at a time. For instance, in case of merging the first front video 1210, the second front video 1230 and the second rear video 1240, referring to FIG. 12 (d), the controller 180 can control the user display region 1215 extracted from the first front video 1210 and the counterpart display region 1235 extracted from the second front video 1230 to be simultaneously displayed using the second rear video 1240 as a background. Moreover, it is a matter of course that the first front video 1210, the second front video 1230 and the first rear video 1220 can be merged as well (not shown in the drawing).

Like the example shown in FIG. 12 (d), in case that a plurality of display regions (e.g., the user display region and the counterpart display region) are displayed on a single background video, the order of arrangement of the display regions is meaningful. In particular, referring to FIG. 12 (d), when the user display region 1215 extracted from the first front video 1210 is placed over the counterpart display region 1235 extracted from the second front video 1230, if the user display region 1215 and the counterpart display region 1235 overlap each other, one portion of the counterpart display region 1235 may be blocked by the user display region 1215. Hence, the controller 180 can adjust the arrangement order of the user display region 1215 and the counterpart display region 1235 based on a user input. In particular, the controller 180 can simply adjust the arrangement order of the user display region 1215 and the counterpart display region 1235 in a manner of changing the order in displaying a layer for displaying the user display region 1215 and a layer for displaying the counterpart display region 1235. A process for changing the arrangement order of the user display region 1215 and the counterpart display region 1235 is described in detail with reference to FIG. 13 as follows.

Figure 13:
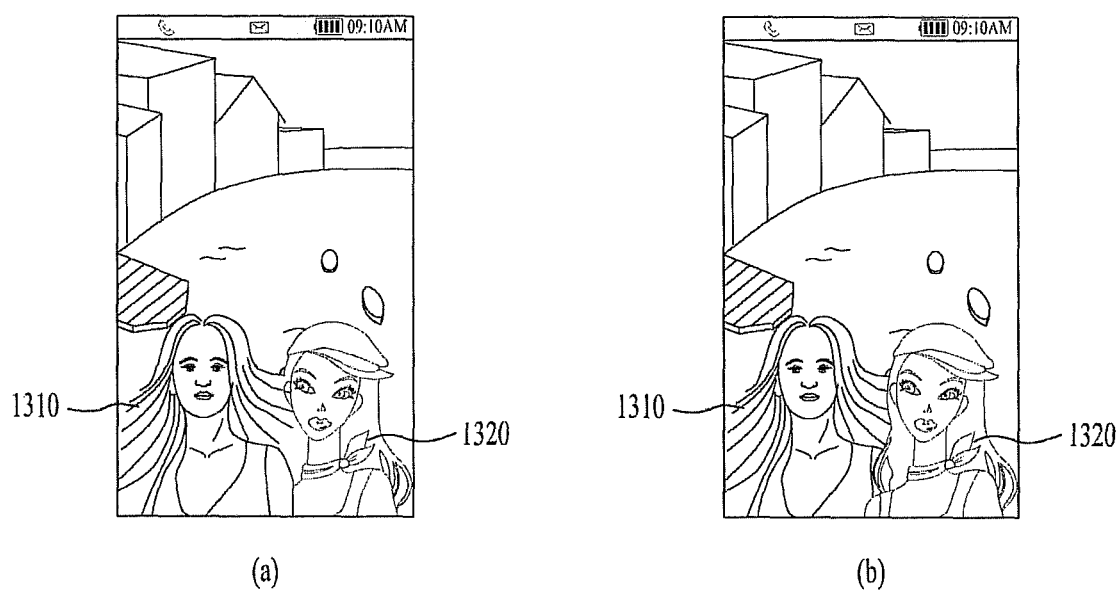
FIG. 13 is a diagram for one example to describe that an arrangement order of a user display region and a counterpart display region is changed.

FIG. 13 is a diagram for one example to describe that an arrangement order of a user display region and a counterpart display region is changed.

Referring to FIG. 13, for clarity of the following description, assume that a user display region 1310 is initially arranged ahead of a counterpart display region 1320. Since the user display region 1310 is arranged ahead of the counterpart display region 1320, if the user display region 1310 and the counterpart display region 1320 overlap each other, one portion of the counterpart display region 1320 may be blocked by the user display region 1310 (FIG. 13 (*a*)).

When the user display region 1310 is arranged ahead of the counterpart display region 1320, if a user input for intending to change the arrangement order is received, the controller 180 can change the arrangement order of the user display region 1310 and the counterpart display region 1320. In particular, the controller 180 can control the counterpart display region 1320 to be arranged ahead of the user display region 1310. Since the counterpart display region 1320 is arranged ahead of the user display region 1310, if the user display region 1310 and the counterpart display region 1320 overlap each other, one portion of the user display region 1310 may be blocked by the counterpart display region 1320 (FIG. 13 (*b*)).

While the counterpart display region 1320 is arranged ahead of the user display region 1310, if a user input for intending to change the arrangement order is received, the user display region 1310 can be arranged ahead of the counterpart display region 1320 again.

In this case, the user input for intending to change the arrangement order can be implemented in various ways including a simultaneous touch with at least two pointers, a long press of an object (e.g., user display region, counterpart display region, etc.) to have a forwarded arrangement order, a double tap to the object, and the like.

While the merged video is displayed, if a user input for intending to interrupt the video merging is received, the controller 180 interrupts the video merging and is then able to return to the screen configuration of displaying 4 videos simultaneously like the example shown in FIG. 12 (*a*). In this case, the user input for intending to interrupt the video merging may include an action or motion of shaking the mobile terminal, a touch input of drawing an imaginary line for dividing the touchscreen into 4 equal parts.

For instance, while a video created from merging a first front video and a second rear video is displayed, if an action of shaking the mobile terminal is detected, the controller 180 interrupts the merging of the first front video and the second rear video and can control the first front video, a first rear video, a second front video and the second rear video to be simultaneously displayed in the same manner of the former case before the video merging.

For another instance, while a video created from merging a first front video and a second rear video is displayed, if a touch input of drawing an imaginary line for dividing the touchscreen into 4 equal parts is applied, the controller 180 interrupts the merging of the first front video and the second rear video and can control the first front video, a first rear video, a second front video and the second rear video to be simultaneously displayed in the same manner of the former case before the video merging. In this case, the touch input of drawing the imaginary line for dividing the touchscreen into the 4 equal parts may include a cross-shaped (+) touch input. If the merging of the first front video and the second rear video is interrupted, the controller 180 can determine display sizes of the first front video, the first rear video, the second front video and the second rear video depending on the sizes of the regions partitioned by the imaginary line for dividing the touchscreen into the 4 equal parts. This is described in detail with reference to FIG. 14 as follows.

Figure 14:
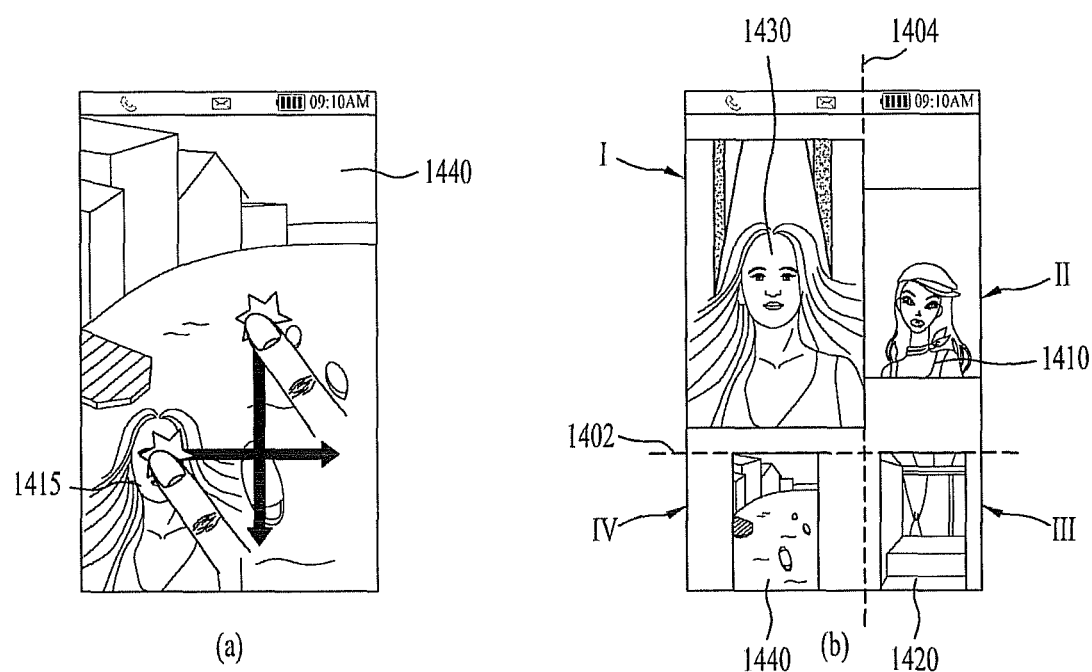
FIG. 14 is a diagram for one example to describe a output change of a touchscreen after interruption of a video merging.

FIG. 14 is a diagram for one example to describe an output change of a touchscreen after interruption of a video merging.

Referring to FIG. 14, for clarity of the following description, assume that the controller 180 displays a video created from merging a user display region 1415 extracted from a first front video 1410 and a second rear video 1440 before receiving a user input for interrupting the video merging.

While the merged video is displayed, if a touch of a cross trace for partitioning the touchscreen into 4 regions is inputted, the controller 180 interrupts the video merging and can control the first front video 1410, a first rear video 1420, a second front video 1430 and the second rear video 1440 to be displayed (FIG. 14 (*a*)).

In doing so, the controller 180 can control sizes of the videos to be determined based on sizes of the 4 regions partitioned by imaginary lines 1402 and 1404 of a cross shape corresponding to the touch of the cross trace, respectively. For clarity, in the example shown in FIG. 14 (*b*), the regions partitioned by the imaginary lines 1402 and 1404 shall be named first to fourth regions I to IV by starting with a left top part clockwise. In the example shown in FIG. 14 (*b*), since the first region I has a greatest size among the 4 regions partitioned by the imaginary lines of the cross shape, a display size of the second front video 1430 set to be displayed through the first region I may be set to a greatest size.

As mentioned in the foregoing description with reference to FIGS. 12 to 14, the mobile terminal according to the present invention can display the first front video taken through the front camera 121, the first rear video taken through the rear camera 121', the second front video received from the counterpart terminal and the second rear video received from the counterpart terminal in the course of a video call.

In the examples shown in FIG. 12 and FIG. 14, a touchscreen is partitioned into 4 regions and a first front video, a first rear video, a second front video and a second rear video are displayed through the 4 regions, respectively. Unlike the examples shown in FIG. 12 and FIG. 14, a first front video can be displayed as a PIP (picture in picture) of a first rear video and a second front video can be displayed as a PIP of a second rear video.

Moreover, the controller 180 can discriminate a case of the touchscreen in portrait mode from a case of the touchscreen in landscape mode. In portrait mode, the controller controls the videos to be displayed through the different regions, respectively. If the portrait mode is switched to the landscape mode, the controller 180 can control the first front video to be switched to the PIP of the first rear video and also control the second front video to be switched to the PIP of the second rear video. This is described in detail with reference to FIG. 15 as follows.

FIG. 15 is a diagram for one example to describe an operation in case of changing an output mode of a mobile terminal.

Referring to FIG. 15, in portrait mode, the controller 180 partitions the touchscreen into 4 regions and can control a first front video 1510, a first rear video 1520, a second front video 1530 and a second rear video 1540 to be displayed through the 4 regions, respectively [FIG. 15 (*a*)]. Thereafter, if the mobile terminal rotates to enter a landscape mode, the controller 180 partitions the touchscreen into two regions, controls the first rear video 1520 and the first front video 1510 to be displayed through one of the two regions in a manner that the first front video 1510 is displayed as a PIP of the first rear video 1520, and also controls the second rear video 1540 and the second front video 1530 to be displayed through the other in a manner that the second front video 1530 is displayed as a PIP of the second rear video 1540 [FIG. 15 (*b*)]. Alternatively, unlike the drawing, the first rear video 1520 can be outputted as a PIP of the first front video 1510 or the second rear video 1540 can be displayed as a PIP of the second front video 1530.

According to one embodiment of the present invention, while a mobile terminal displays a video created from merging two of four videos, if a display mode of the mobile terminal is changed, the controller 180 merges the remaining two videos excluded from the video merging with each other and is then able to control the two merged videos to be simultaneously displayed. This is described in detail with reference to FIG. 16 as follows.

Figure 16:
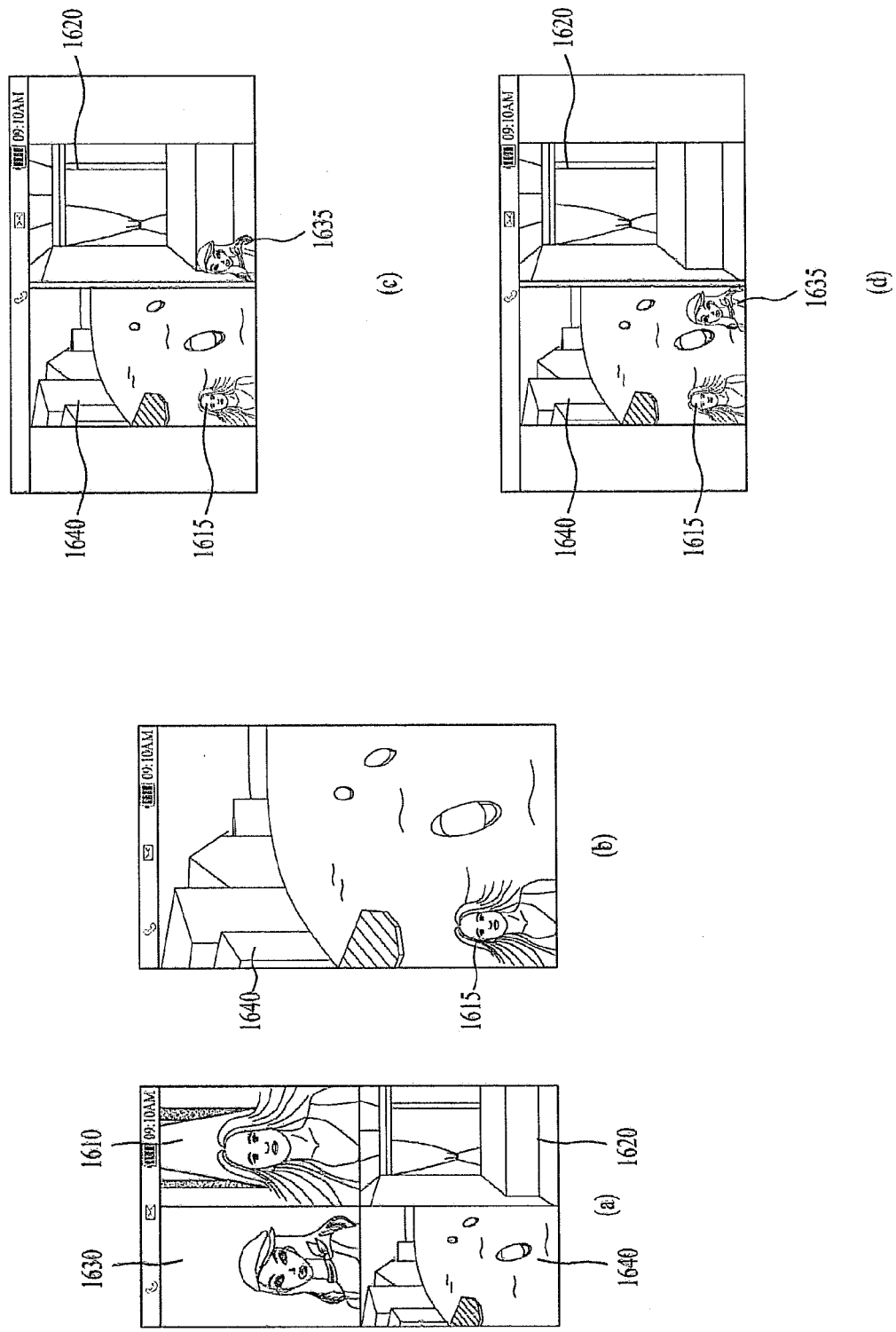
FIG. 16 is a diagram for one example to describe an operation of a mobile terminal in case of changing a display mode.

FIG. 16 is a diagram for one example to describe an operation of a mobile terminal in case of changing a display mode.

Referring to FIG. 16, since operations of the mobile terminal related to FIG. 16 (a) and FIG. 16 (b) can refer to the former description with reference to FIG. 12 (a) and FIG. 12 (b), their details shall be omitted from the following description. While a merged video created from merging a user display region 1615 extracted from a first front video 1610 and a second rear video 1640 is displayed, as the mobile terminal is turned to enter a landscape mode (FIG. 16 (b)), the controller 180 can control a video, which is created from merging the remaining videos (i.e., a second front video 1630 and a first rear video 1620) failing in configuring the merged video, to be simultaneously displayed together with the video created from merging the first front video 1610 and the second rear video 1640 (FIG. 16 (c)). While the two merged videos are displayed, the controller 180 may control the user display region 1615 extracted from the first front video 1610 to be shifted over the first front video 1610 based on a user input or may control a counterpart display region 1635 extracted from the second front video 1630 to be shifted over the second rear video 1640 based on a user input. For instance, if a user shifts the counterpart display region 1635, which is displayed over the first rear video 1620, over the second rear video 1620 in the example shown in FIG. 16 (c), the controller 180 can control the counterpart display region 1635 to be shifted over the second rear video 1640 (FIG. 16 (d)).

As mentioned in the foregoing description with reference to FIG. 4 and FIG. 16, the mobile terminal according to the present invention merges a first video and a second video sent by a counterpart, thereby providing a user with an optical illusion as if located in the same space of a video call counterpart. A counterpart terminal receives the first video or a video created from merging the first video and the second video from the mobile terminal.

According to another embodiment of the present invention, the mobile terminal can set a counterpart terminal to use the same background video of the mobile terminal. For instance, if the mobile terminal is set to display a user display region extracted from a first front video using a first rear video as a background, the counterpart terminal can be also set to display a counterpart display region extracted from a second front video using the first rear video as a background. If the mobile terminal is set to display the user display region extracted from the first front video using a second rear video received from the counterpart terminal as a background, the counterpart terminal may be set to display the counterpart display region extracted from the second front video using the second rear video as a background as well. A process for sharing a background video between a mobile terminal and a counterpart terminal is described in detail with reference to FIG. 17 as follows.

Figure 17:
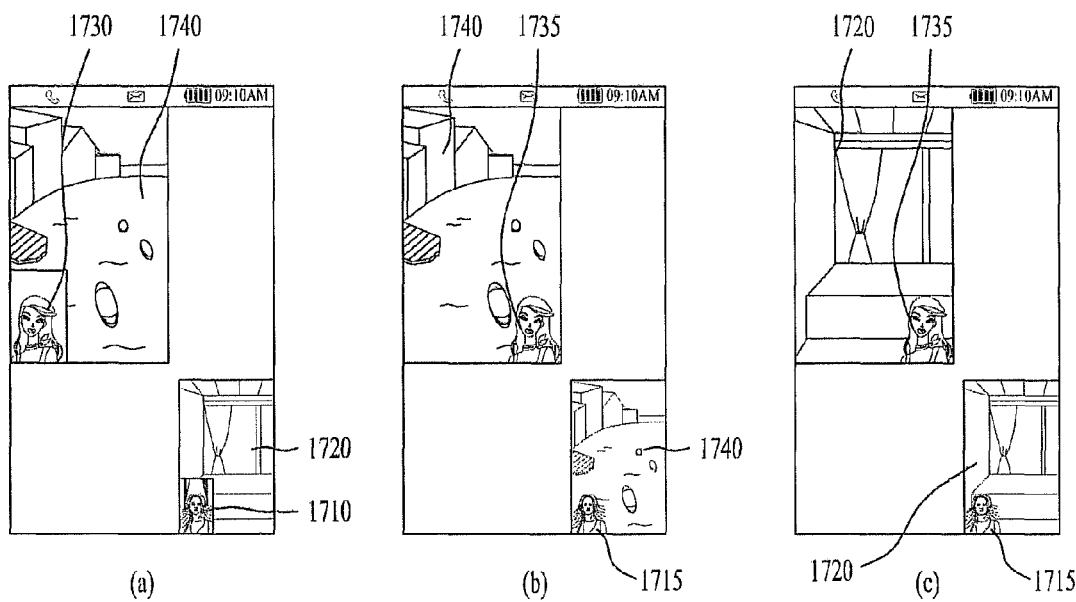
FIG. 17 is a diagram for one example to describe that a mobile terminal and a counterpart terminal share a background video with each other.

FIG. 17 is a diagram for one example to describe that a mobile terminal and a counterpart terminal share a background video with each other.

Referring to FIG. 17, for clarity of the following description, assume that the mobile terminal displays a first front video taken through the front camera 121 in the course of a video call to a counterpart terminal, a first rear video taken through the rear camera 121', a second front video received from the counterpart terminal and a second rear video received from the counterpart terminal (FIG. 17 (a)).

In the course of the video call, if the mobile terminal and the counterpart terminal are set to share the second rear video as a background video, the controller 180 can merge a user display region extracted from the first front video and the second rear video with each other (FIG. 17 (b)). In doing so, the counterpart terminal can merge a counterpart display region extracted from the second front video using the second rear video as a background. In particular, each of the mobile terminal and the counterpart terminal can perform the video merging using the second rear video as a background.

On the other hand, if the mobile terminal and the counterpart terminal are set to share the first rear video as a background video, the controller 180 can merge a user display region extracted from the first front video and the first rear video with each other [FIG. 17 (c)]. In doing so, the counterpart terminal set to share the background video is also able to merge a counterpart display region extracted from the second front video using the second rear video as a background.

While the mobile terminal and the counterpart terminal share the background video, in case that a third party newly participates in the video call, each of the mobile terminal and the counterpart terminal can send a video merged on the basis of the background video set to be shared to a terminal of the third party. Since the terminal of the third party newly participating in the video call is not set to share the background video yet, each of the mobile terminal and the counterpart terminal may be able to receive and display an image photographed through the terminal of the third party.

Figure 18:
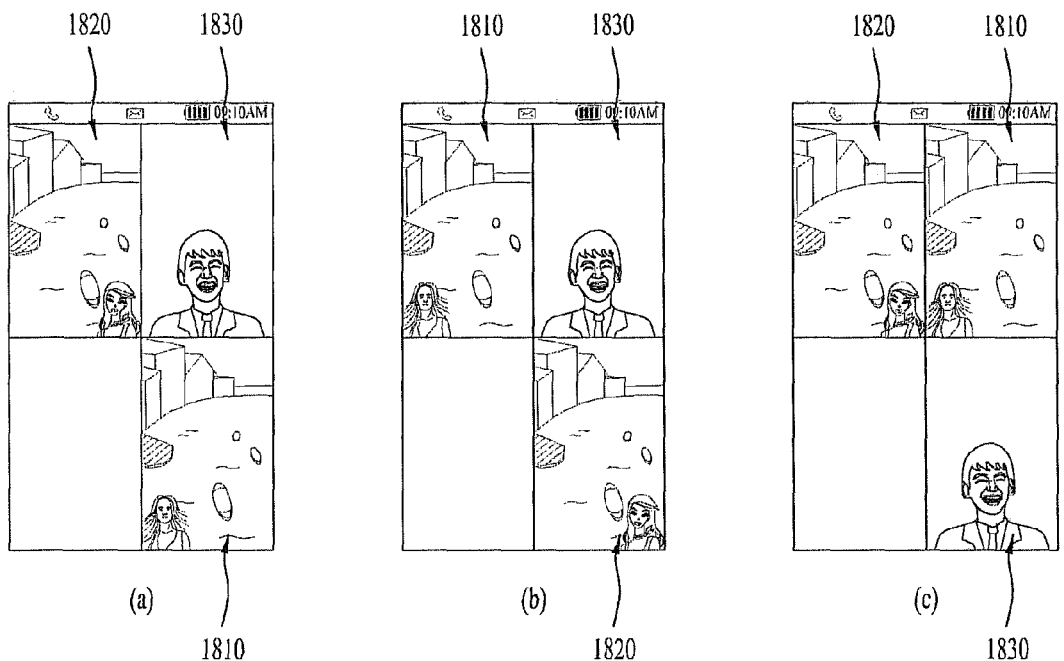
FIG. 18 is a diagram for one example to describe an output from each terminal in case that a third party newly participates in a video call.

FIG. 18 is a diagram for one example to describe an output from each terminal in case that a third party newly participates in a video call. For clarity of the following description, a mobile terminal and a counterpart terminal are set to share a second rear video as a background video before a third party participates in a video call.

FIG. 18 (a) is a diagram for one example of an output of the mobile terminal. Referring to FIG. 18 (a), the controller 180 can send a video 1810, which is created from merging a user display region extracted from a first front video using a second rear video as a background, to a counterpart terminal and a third party terminal. Moreover, the controller 180 can receive and display a merged video 1820 from the counterpart terminal and can also receive and display a video 1830 having a different background from the third party terminal.

FIG. 18 (b) is a diagram for one example of an output of the counterpart terminal. Referring to FIG. 18 (b), the counterpart terminal can send a video 1820, which is created from merging a counterpart display region extracted from a second front video using the second rear video as a background, to the mobile terminal and the third party terminal. Moreover, the counterpart terminal can receive and display the merged video 1810 from the mobile terminal and can also receive and display the video 1830 having the different background from the third party terminal.

FIG. 18 (c) is a diagram for one example of an output of the third party terminal newly participating in the video call. Referring to FIG. 18 (c), the third party terminal can sent the video 1830 taken through its front camera 121 or rear camera 121' to each of the mobile terminal and the counterpart terminal. Since the third party terminal has not been set yet to share the background video with the mobile terminal and the counterpart terminal, the video 1830 taken through the third party terminal may have a background different from that of the merged video 1810 in the mobile terminal or the merged video 1820 in the counterpart terminal.

In the above-described example, a mobile terminal and a counterpart terminal share a background video. And, the mobile terminal creates a merged video by combining a user display region over the background video. Moreover, the counterpart terminal creates a merged video by combining a counterpart display region over the background video. In substitution for the background video, the mobile terminal and the counterpart terminal may be set to share a background image (e.g., a still image) with each other. In particular, the mobile terminal creates a merged video by combining a user display region over the shared background video and the counterpart terminal creates a merged video by combining a counterpart display region over the shared background video. In this case, the shared background image may include an image saved in the mobile terminal or the counterpart terminal. And, the video created by each of the mobile terminal and the counterpart terminal, which are set to share the background image with each other, may be set using the same background.

According to another embodiment of the present invention, in case that the mobile terminal and the counterpart terminal are set to share a background image with each other, the controller 180 divides the background image into n regions and can control the mobile terminal and the counterpart terminal to use different regions of the background image, respectively. This is described in detail with reference to FIG. 19 as follows.

Figure 19:
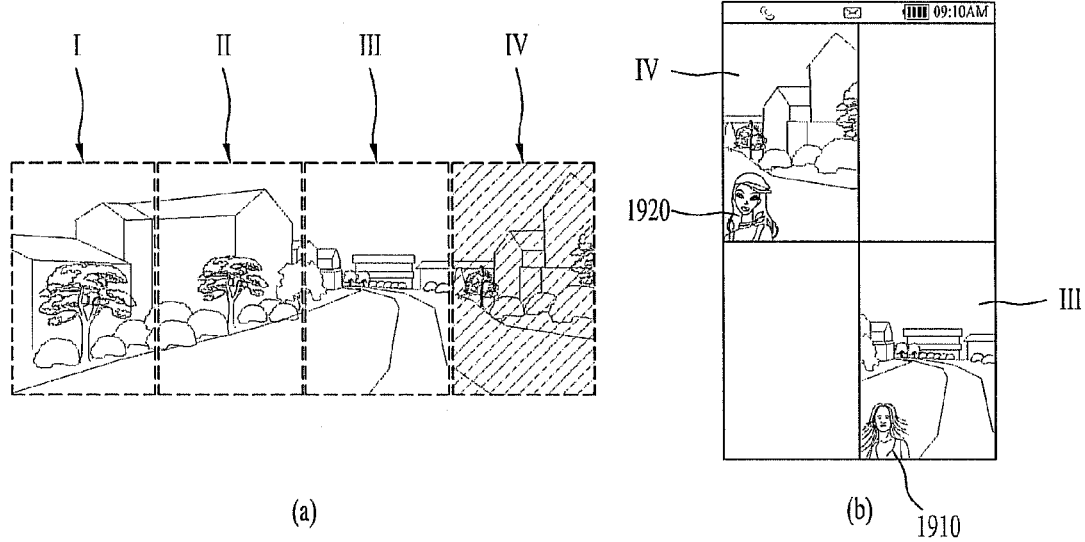
FIG. 19 is a diagram for one example to describe an operation in case that a background image is set to be shared with a counterpart terminal.

FIG. 19 is a diagram for one example to describe an operation in case that a background image is set to be shared with a counterpart terminal.

Referring to FIG. 19 (a), if a background image to be shared with a counterpart terminal is selected, the controller 180 can divide the background image into n regions. In this case, 'n' is a natural number equal to or greater than 2 and may be set to the number equal to or greater than the number of minimum video call participants. For clarity of the present description, in the example shown in FIG. 19 (a), 4 regions generated from dividing the background image shall be named first to fourth regions in order by starting with a left side, respectively.

Each of the mobile terminal and the counterpart terminal selects a specific region from the background image divided into the n regions and is then able to use the selected specific region as a background. For instance, while the mobile terminal is creating a video merged using the third region III of the background image as a background, the counterpart terminal may create a video merged using the fourth region IV of the background image as a background.

In doing so, in order to prevent each of the mobile terminal and the counterpart terminal from selecting the same region, the controller 180 may deactivate the region selected by the counterpart terminal not to be selected by a user or may control a region selected by the user not to be selected by a counterpart. For instance, if the counterpart terminal selects the fourth region IV of the background image in advance, the controller 180 can set the fourth region IV of the background image as a disabled region that cannot be selected by the user (FIG. 19 (a)). If the user selects the third region III of the background image, the controller 180 can create a merged video by combining a user display region 1910 using the third region III of the background image as a background (FIG. 19 (b)).

It may be advantageous for a panorama image, of which horizontal length is relatively long, to divide a background video into ne regions. Hence, if a request for sharing a background image is received from a counterpart terminal, the controller 180 activates the camera 121 to take the background image to share and may control a photographing mode to be automatically set to a panorama photographing mode.

In case of not intending to watch a video received from a video call counterpart, the mobile terminal according to the present invention can control a substitute video or a substitute image to be displayed in substitution for the video received from the video call counterpart. In particular, the mobile terminal according to the present invention interrupts to display the video received from the counterpart terminal. Alternatively, the mobile terminal processes the video received from the counterpart terminal and then displays the processed video. The corresponding process shall be described in detail with reference to FIGS. 20 to 22 as follows. For clarity of the following description, assume a situation in which the mobile terminal performs a video call to two counterparts. And, videos received from the two counterparts shall be named a first received video and a second received video, respectively.

Figure 20:
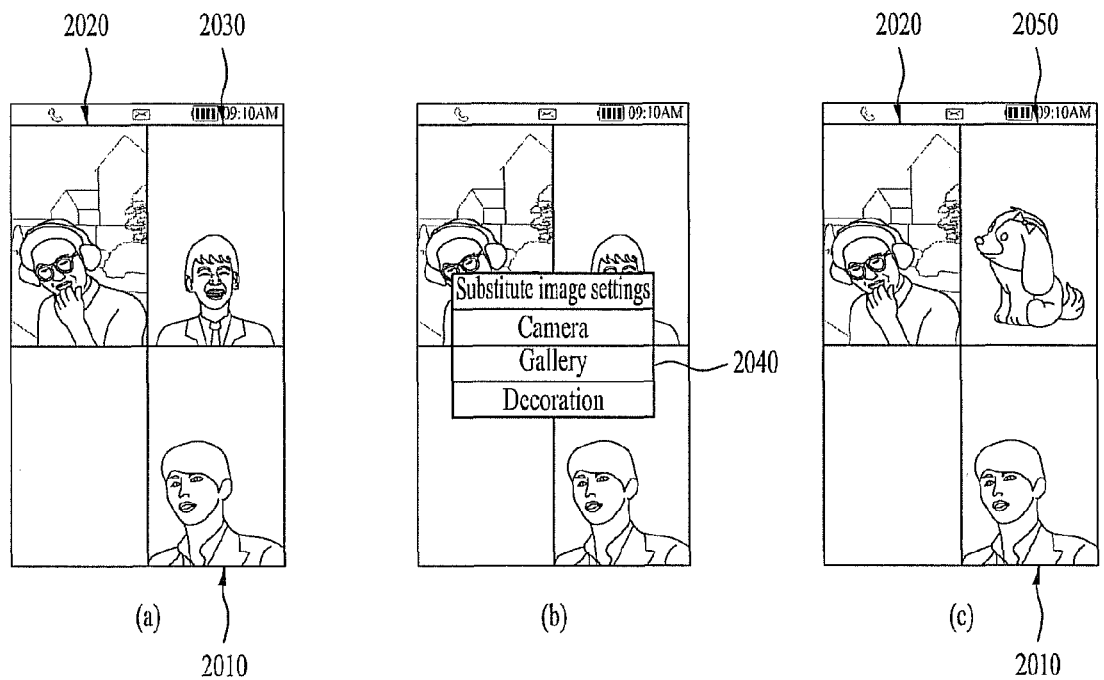
FIG. 20 is a diagram for one example to describe that a real-time taken video is displayed in substitution for a video received from a counterpart.

FIG. 20 is a diagram for one example to describe that a real-time taken video is displayed in substitution for a video received from a counterpart.

Referring to FIG. 20, the mobile terminal in the course of a video call to two counterparts can display a first video 2010 taken through the camera 121 of the mobile terminal and first and second received videos 2020 and 2030 respectively received from a plurality of counterpart terminals (FIG. 20 (a)). In doing so, if a user input for substituting the second received video 2030 among the videos received from a plurality of the counterpart terminals with a substitute image is applied, the controller 180 can control a popup window 2040, which is provided to select a type of the substitute image, to be displayed (FIG. 20 (b)). If an item 'Camera' is selected from the popup window 2040, the controller 180 activates the camera 121 in a disabled state and is then able to control the second received video 2030 to be substituted with a video 2050 taken through the newly activated camera 121 (FIG. 20 (c)). If a first video for the video call is being taken through the front camera 121, the substitute image for the second received video 2030 may include an image taken through the rear camera 121' different from the front camera 121 through which the first video is being taken. On the other hand, if a first video for the video call is being taken through the rear camera 121', the substitute image for the second received video 2030 may include an image taken through the front camera 121 different from the rear camera 121' through which the first video is being taken. Moreover, the controller 180 can control a specific part of the second received video 2030 to be substituted with the substitute image only (not shown in the drawing). For instance, in case of attempting to change a face of a character taken in the second received video 2030 into a selected image, the controller 180 crops a face region from an image taken through the newly activated camera only and is then able to attach the cropped partial video to a face region of the second received video 2030.

FIG. 21 is a diagram for one example to describe that an image is displayed in substitution for a video received from a counterpart.

Referring to FIG. 21, if an item 'image' is selected from the popup window 2040 shown in FIG. 20, the controller 180 can display an image list saved in the memory 160 (FIG. 21 (a)). If an image for substituting for a second received video 2030 is selected from the image list shown in FIG. 21 (a), the controller 180 can control the selected image 2110 to be displayed in substitution for the second received video 2030 (FIG. 21 (b)). Alternatively, the controller 180 may control a specific part of the second received video 2030 to be substituted with the selected image only [not shown in the drawing]. For instance, in case of attempting to change a face of a character taken in the second received video 2030 into the selected image, the controller 180 crops a face region from the selected image only and is then able to attach the cropped partial image to a face region of the second received video 2030.

Figure 22:
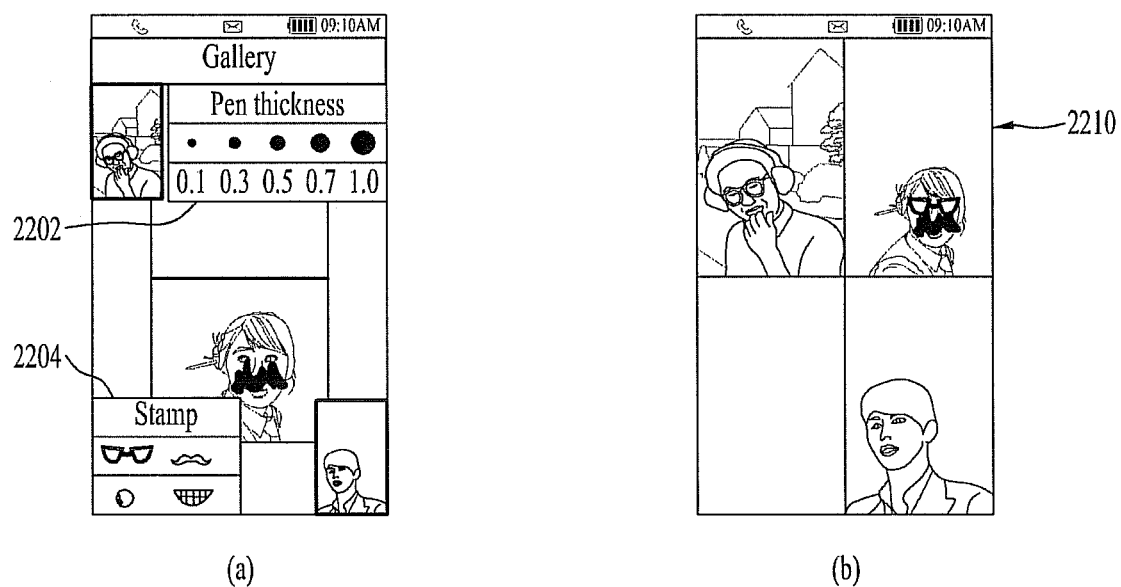
FIG. 22 is a diagram for one example to describe that a video received from a counterpart is decorated.

FIG. 22 is a diagram for one example to describe that a video received from a counterpart is decorated.

Referring to FIG. 22, if an item 'decoration' is selected from the popup window 2040 shown in FIG. 20, the controller 180 can control a drawing tool, which is provided to decorate a second received video 2130, to be displayed (FIG. 22 (a)). In this case, the drawing tool may include a pen tool 2022 for inputting a handwriting onto a video, a tamp tool 2204 and the like. If an editing of the second received video is completed using the drawing tool, the controller 180 can control an edited second received video 2210 to be displayed (FIG. 22 (b)).

It is a matter of course that the above-described embodiments are applicable in the course of a 1:1 video call between a mobile terminal and a counterpart terminal. And, it is also mater of course that the above-described embodiments are applicable to a 1:N video call between a mobile terminal and a plurality of counterpart terminals.

The mobile terminal according to the present invention may be usable in merging a front video and a rear video for a dual recording irrespective of performing a video call to a counterpart terminal.

In this case, the dual recording means that both a front video and a rear video are taken by activating or enabling both of the front camera 121 and the rear camera 121' in taking videos. In particular, the controller 180 extracts a user display region (i.e., a video photographer display region) from the front video in the course of performing the dual recording and is then able to merge the extracted user display region and the rear video with each other. This is described in detail with reference to FIG. 23 as follows.

FIG. 23 is a diagram for one example to describe that a front video and a rear video are merged with each other in the course of a dual recording.

Referring to FIG. 23, assume that a rear video and a front video are shown in FIG. 23 (a) and FIG. 23 (b), respectively. The controller 180 can control a user display region, which is extracted from the front video, and the rear video to be merged with each other (FIG. 23 (c)).

Accordingly, embodiments of the present invention provide various effects and/or features.

First of all, the present invention provides a mobile terminal and controlling method thereof, thereby enhancing user's convenience.

In particular, the present invention provides a mobile terminal, by which an optical illusion can be caused as if video call participants are located in the same space.

It will be appreciated by those skilled in the art that the present invention can be specified into other form(s) without departing from the spirit or scope of the inventions.

In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal to perform a video call with a counterpart terminal, the mobile terminal comprising:
   a camera to create a first video having a user within the first video;
   a wireless communication unit to receive a second video from the counterpart terminal;
   a controller configured to extract a user display region from the first video and to merge the user display region and the second video; and
   a display unit to display the merged video of the user display region and the second video,
   wherein when the mobile terminal is set to share, with the counterpart terminal, the merged video of the user display region and the second video, the controller is configured to control the merged video of the user display region and the second video to be sent to the counterpart terminal,
   wherein when the mobile terminal is set not to share the merged video with the counterpart terminal, the controller is configured to control the first video to be sent to the counterpart terminal, and
   wherein when a plurality of first people are in the first video, the controller is configured to select a largest one of display regions of the plurality of first people as the user display region.

2. The mobile terminal of claim 1, wherein the controller is configured to extract the user display region from the first video based on an outline of the user in the first video.

3. The mobile terminal of claim 1, wherein when a plurality of second people are included in the second video, the controller is configured to delete display regions of the remainder of the second people other than a display region of the person determined as a true counterpart from the second video.

4. The mobile terminal of claim 3, wherein the controller is configured to select a largest one of display regions of the plurality of second people as the true counterpart.

5. The mobile terminal of claim 1, wherein the camera includes a front camera to photograph from a front of the mobile terminal and a rear camera to photograph from a rear of the mobile terminal, and
wherein the first video includes at least one of a first front video from the front camera and a first rear video from the rear camera.

6. The mobile terminal of claim 5, wherein the merged video represents the user display region extracted from the first video and a counterpart display region extracted from the second video, wherein the first rear video is used as a background for the user display region and the counterpart display region.

7. The mobile terminal of claim 1, wherein the second video includes at least one of a second front video from a front camera of the counterpart terminal and a second rear video from a rear camera of the counterpart terminal.

8. The mobile terminal of claim 7, wherein when the second video includes one of the second front video and the second rear video, the controller is configured to request the counterpart terminal to provide the other one of the second front video and the second rear video in response to a user input.

9. The mobile terminal of claim 7, wherein when both of the second front video and the second rear video are received from the counterpart terminal, the merged video represents the user display region extracted from the first video and a counterpart display region extracted from the second front video, wherein the second rear video is used as a background for the user display region and the counterpart display region in the merged video.

10. The mobile terminal of claim 9, wherein the controller is configured to adjust an arrangement order of the user display region and the counterpart display region based on a user input.

11. The mobile terminal of claim 1, wherein the user display region is displayed in a front layer and the second video is displayed in a rear layer behind the front layer in the merged video, and
wherein the controller is further configured to reduce or enlarge the second video in the rear layer without reducing or enlarging the user display region of the first video in the front layer in the merged video, in response to a pinch-in or pinch-out input to the second video in the merged video.

12. A method of controlling a mobile terminal during a video call with a counterpart terminal, the method comprising:
receiving a first video through a camera of the mobile terminal;
receiving a second video from the counterpart terminal;
extracting a user display region from the first video;
merging the user display region and the second video;
displaying the merged video of the user display region and the second video on a display of the mobile terminal;
sending the merged video to the counterpart terminal when the mobile terminal is set to share the merged video with the counterpart terminal;
sending the first video to the counterpart terminal when the mobile terminal is set not o share the merged video with the counterpart terminal; and
selecting a largest one of display regions of a plurality of first people as user display region when the plurality of first people are in the first video.

13. The method of claim 12, wherein the extracting of the user display region from the first video is based on an outline of the user in the first video.

14. The method of claim 12, further comprising:
when a plurality of second people are in the second video, removing display regions of the remainder of the second people other than a display region of the person determined as a true counterpart from the second video.

15. A mobile terminal comprising:
a camera to provide a first video that includes a person;
a wireless communication unit to receive a signal from a counterpart terminal;
a controller configured to extract a user display region from the first video that includes the person, and to combine features of the user display region and a second video; and
a display to display the combined features of the user display region and the second video,
wherein when the mobile terminal is set to share the combined features with the counterpart terminal, the controller is configured to control the combined features to be sent to the counterpart terminal,
wherein when the mobile terminal is set not to share the combined features with the counterpart terminal, the controller is configured to control the first video to be sent to the counterpart terminal, and
wherein when a plurality of people are in the first video, the controller is configured to select a largest one of display regions of the plurality of people as the user display region.

16. The mobile terminal of claim 15, wherein the wireless communication unit to receive the second video from the counterpart terminal.

17. The mobile terminal of claim 15, wherein the controller is configured to extract thedisplay region from the first video based on a shape of the person in the first video.

18. The mobile terminal of claim 15, wherein the camera includes a front camera and a rear camera, and
wherein the first video includes at least one of a first front video from the front camera and a first rear video from the rear camera.

19. The mobile terminal of claim 18, wherein the combined features represents the user display region extracted from the first video and a counterpart display region extracted from the second video, wherein the first rear video is used as a background for the combined features.

* * * * *